US008740058B2

(12) United States Patent
Brucker et al.

(10) Patent No.: US 8,740,058 B2
(45) Date of Patent: Jun. 3, 2014

(54) INTEGRATED VOTE BY MAIL PROCESSING SYSTEM

(75) Inventors: Brian Brucker, North Canton, OH (US);
Harminder Patria, Everett, WA (US);
Brian Clubb, Everett, WA (US); Lester Wright, Lynwood, WA (US); Bryan A. Pittman, Alliance, OH (US); Donald S. Nelson, Jr., Akron, OH (US); Robert L. Leonard, Jr., Henderson, NV (US);
Bradley W. Borne, Uniontown, OH (US); Brett Barrett, Everett, WA (US);
Jerry Wagoner, Everett, WA (US);
Gary Lemmon, Bothell, WA (US); John Elder, Lake Stevens, WA (US); Darrin Heffernan, Olympia, WA (US)

(73) Assignee: Electron Systems & Software, LLC, Omaha, NE (US)

(*) Notice: Subject to any disclaimer, the term of this patent is extended or adjusted under 35 U.S.C. 154(b) by 292 days.

(21) Appl. No.: 11/820,787

(22) Filed: Jun. 20, 2007

(65) Prior Publication Data

US 2007/0248248 A1     Oct. 25, 2007

Related U.S. Application Data

(62) Division of application No. 11/183,563, filed on Jul. 18, 2005, now Pat. No. 7,240,835.

(60) Provisional application No. 60/589,268, filed on Jul. 18, 2004.

(51) Int. Cl.
*G07C 13/00*     (2006.01)

(52) U.S. Cl.
USPC ............................................ 235/51; 235/386

(58) Field of Classification Search
USPC ..................... 235/386, 51; 382/119
See application file for complete search history.

(56) References Cited

U.S. PATENT DOCUMENTS

| | | | |
|---|---|---|---|
| 4,250,806 A * | 2/1981 | Boyson et al. ................. 101/2 |
| 5,412,727 A * | 5/1995 | Drexler et al. ................ 713/186 |
| 6,282,525 B1 * | 8/2001 | Kubatzki et al. .............. 705/410 |
| 6,641,033 B2 | 11/2003 | McClure et al. |
| 6,662,998 B2 | 12/2003 | McClure et al. |
| 6,688,517 B1 | 2/2004 | McClure et al. |
| RE38,637 E | 10/2004 | Willard |
| 7,054,829 B2 * | 5/2006 | Campo et al. .................. 705/12 |
| 7,077,313 B2 * | 7/2006 | Chung et al. .................. 235/386 |
| 7,077,314 B2 | 7/2006 | Johnson |
| 7,216,807 B2 | 5/2007 | McClure |
| 7,407,100 B2 | 8/2008 | Guyett et al. |

(Continued)

*Primary Examiner* — Michael Lee
*Assistant Examiner* — Rafferty Kelly
(74) *Attorney, Agent, or Firm* — Stinson Leonard Street LLP

(57) ABSTRACT

A modular integrated software and hardware suite can accept data exported from a voter registration database corresponding to requests for mail ballots, sort the data as necessary for ballot preparation, create a road map for ballot mailing preparation, provide for mail presorting, scan returned ballot envelopes using a ballot envelope scanner, and accept data from the scanner. The scanner uses a passive feed system, a separator brush, and a variable speed straight paper path to minimize jamming through the ballot envelope scanner. The scanner can work with a workstation application to interpret a barcode, store an image of the ballot envelope signature in association with a specific voter, print an endorsement on each verified ballot envelope, and store the endorsement with the signature image. The scanner can divert ballot envelopes with unrecognizable or unmatched barcodes to a separate tray for manual processing.

14 Claims, 18 Drawing Sheets

(56) References Cited

U.S. PATENT DOCUMENTS

| | | |
|---|---|---|
| 2003/0026462 A1* | 2/2003 | Chung et al. ............... 382/119 |
| 2006/0049252 A1 | 3/2006 | Guyett |
| 2007/0095908 A1 | 5/2007 | Haas |
| 2008/0105741 A1 | 5/2008 | Haas |
| 2008/0121680 A1 | 5/2008 | Quine et al. |
| 2008/0136162 A1 | 6/2008 | Haas et al. |
| 2008/0156855 A1 | 7/2008 | Sanchez |
| 2008/0156862 A1 | 7/2008 | Haas |
| 2008/0173714 A1 | 7/2008 | Kite |
| 2008/0296375 A1 | 12/2008 | Haas et al. |
| 2008/0314997 A1 | 12/2008 | Haas et al. |
| 2009/0091119 A1 | 4/2009 | Haas et al. |
| 2009/0159655 A1 | 6/2009 | Haas |
| 2009/0160174 A1 | 6/2009 | Haas et al. |
| 2009/0322070 A1 | 12/2009 | Reichelsheimer et al. |
| 2010/0001070 A1 | 1/2010 | Critelli |
| 2010/0058483 A1 | 3/2010 | Haas |
| 2010/0145883 A1 | 6/2010 | Guyett et al. |

* cited by examiner

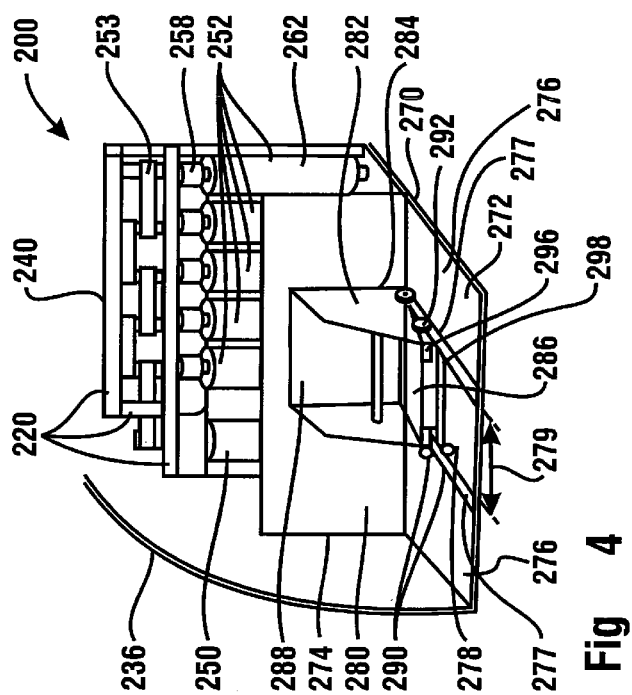
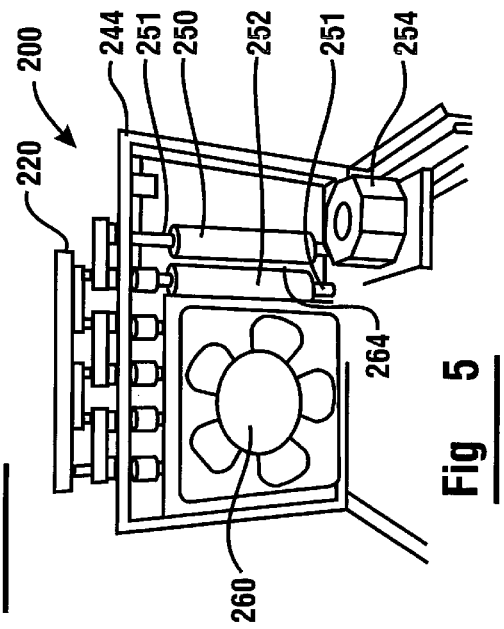

INTEGRATED VOTE BY MAIL PROCESSING SYSTEM

CROSS REFERENCE TO RELATED APPLICATIONS

This application is a divisional of U.S. application Ser. No. 11/183,563 filed Jul. 18, 2005, which claims benefit pursuant to 35 U.S.C. §119(e) of U.S. Provisional Application 60/589,268 filed Jul. 18, 2004, and the disclosure of each application is herein incorporated by reference.

TECHNICAL FIELD

This invention relates generally to the processing of vote by mail ballots. Specifically, this invention relates to preparation and tracking of outgoing ballots and to receipt, sorting, and verification of incoming ballots.

BACKGROUND ART

Vote by mail ballots are commonly used in elections as part of the absentee voting process. Typically voters who expect to be absent from their polling on election day, or expect to be unable to reach their polling place for other reasons may request to vote by mail. In addition, some jurisdictions permit, or even encourage, voters to vote by mail by establishing a permanent vote by mail status. Individuals who have requested to vote by mail are typically mailed a ballot in advance of the election. The voter will mark the ballot, insert it in a special return envelope, sign the outside of the envelope, and mail it back to a central location to be tallied.

Management of voting by mail is a complex, costly, and labor intensive process. Each voting jurisdiction prepares numerous ballot types for each election in order to present each voter with the particular subset of issues and candidates that are associated with that voter's particular state, county, city, school district, road district, party, or other categories. For each mail ballot requested, the individual must be identified as a registered voter by consulting the voter registration database to determine if the individual is a registered voter. Once an individual is identified as a registered voter, the voter must then be associated with, and sent, the correct ballot for that particular voter based on address, party affiliation, and other characteristics.

Isolated portions of this process are currently automated, such as printing mailing labels for mail ballots. Much of it, however, remains labor intensive manual work, including identifying absentee voter status and required ballot, affixing the labels to the envelopes, selecting and inserting and sealing the correct ballot in the envelope, and organizing the outgoing envelopes in trays for delivery to the post office. Because mail ballots are not necessarily requested and printed in the optimum order for mailing, voting jurisdictions currently cannot generally take advantage of reduced rates which are available for specially sorted mail.

Once the ballots have been mailed to absentee voters, a number of things may happen to the ballots. For the most part, the proper absentee voter will receive and cast one mail-in ballot. Occasionally a voter will misplace his or her first ballot, request a second one, and inadvertently mail back both. Similarly, a voter may request and mail back an absentee ballot, forget that he or she had done so, and vote at the polling place as well. In other instances individuals interested in stuffing the ballot box may deliberately request duplicate ballots or intercept, vote, and return absentee ballots that were not intended for them. Because not every returned ballot is eligible to be cast, once the ballot is marked and returned, the ballot envelope must be verified as associated with a unique registered voter who has not yet voted.

Currently when ballots return for counting they are either associated with a particular voter by visually checking the voter number and comparing it with the data in the voter registration database, or if the envelope contains a barcode it may be identified and associated with a particular voter by scanning the barcode with a hand held barcode reader. Attempts to automate this process have generally been unsuccessful because of the difficulties associated with automated scanning and processing of the envelopes. Even in a single voting jurisdiction, ballots may vary considerably in size because of precinct issues or candidates, creating return ballot envelopes of varying thicknesses. It has generally been impossible to automate the processing without requiring the user to specially sort the envelopes by thickness, and to make adjustments to the scanning hardware between processing stacks of returned ballot envelopes of different thicknesses. Even when manual presorting and hardware adjustment is done, currently existing technology does not permit the automated sorting of ballot envelopes into separate stacks of accepted and rejected ballot envelopes based automated verification that the envelope returned corresponds to one requested by an individual voting by mail. Even though there are mail sorting devices available for massive, relatively permanent sorting facilities, such large expensive immobile technology has not been adaptable for use in small occasional sorting operations such as required for processing ballot envelopes a few times a year.

Once the registered voter associated with a particular envelope has been identified, the voter's signature on the envelope must be compared with the voter's signature on file in order to ensure that the ballot was not inadvertently or deliberately cast by an individual other than the registered voter. Currently, this is done for each voter by visually comparing the signature on the ballot envelope either with a paper exemplar or an electronic one that may be selected manually and displayed on a computer screen.

Another difficulty arises when two ballot envelopes are apparently returned by the same voter. In the processes currently available, it is very difficult to track where an individual ballot envelope is stored once it has been identified as associated with a particular voter. In the event that a second apparently legitimate ballot envelope is returned by the same voter, or the voter appears at the polls to vote, election workers need to be able to retrieve the initial ballot envelope for review and resolution of the conflict. Under the current manual system, it is difficult to locate the previously received ballot once it has passed the initial review.

In addition, the mail ballot processing system comprises a series of isolated tasks. There is currently no integrated method of following the process from start to finish to ensure continuity, thoroughness, and timely completion.

Thus, there is a need for an integrated system for the management of vote by mail voting which reduces the labor and associated costs by interfacing with the existing voter registration database; automating the preparation, mailing, and return verification process; and by creating an integrated record of the absentee ballot from voter request to verified return.

DISCLOSURE OF INVENTION

It is an object of an exemplary form of the present invention to provide an integrated system for managing voting by mail.

It is a further object of an exemplary form of the present invention to provide a system for tracking voting by mail beginning with a request to vote by mail through the return of the ballot.

It is a further object of an exemplary form of the present invention to provide an apparatus for scanning returned ballots that is capable of moving ballot envelopes of varying thickness through such apparatus without requiring manually sorting of the ballot envelopes by thickness.

It is a further object of an exemplary form of the present invention to provide an apparatus for scanning returned ballots that is capable of creating a scanned image of a portion of the outside of each ballot envelope as it passes through an apparatus for scanning returned ballots, interpreting the scanned image to isolate and identify a unique voter, endorsing the ballot envelope with a locating number, and rejecting ballot envelopes which do not meet preset verification criteria.

It is a further object of an exemplary form of the present invention to provide an apparatus for scanning returned ballots that is characterized by being modular and which is small enough to sit on a common office tabletop during operation, with each individual module of a size that is adapted to be shipped using a commercial parcel carrier such as UPS, USPS, or Fed Ex.

It is a further object of an exemplary form of the present invention to provide a system which may be selectively used for automated visual side by side comparison of a ballot envelope signature to an exemplar signature or alternately for automated electronic comparison of such signatures.

It is a further object of an exemplary form of the present invention to provide an apparatus for scanning returned ballots that is adapted to substantially decrease paper jams during scanning and to simplify the process of resolving any jams that do occur.

The foregoing objects are accomplished in an exemplary embodiment of the invention by a modular integrated software and hardware suite that accepts data exported from a voter registration database corresponding to requests for mail ballots, sorts the information as necessary for ballot preparation, creates a road map for preparing ballots for mail, provides for mail presorting, scans returned ballot envelopes using a ballot envelope scanner, accepts data from such ballot envelope scanner, matches the data from the scanned returned ballots with information in the voter registration database, sorts ballots that cannot be electronically matched to a particular voter into a separate stack for manual processing, automates the signature verification process for electronically matched ballots, and returns updated data to the voter registration database.

In one exemplary embodiment, a ballot envelope scanner uses a passive feed system, a separator brush, a straight paper path, and clusters of rollers, each cluster of which is controlled by a motor and appropriate reduction gears to minimize jamming by varying the ballot envelope speed through the ballot envelope scanner. In addition, the exemplary ballot envelope scanner includes sensors that track the ballot envelope through the ballot envelope scanner and automatically shuts the ballot envelope scanner down in the event two ballot envelopes overlap, provides an automated unjamming routine, and includes an easily accessible paper path in the event of a residual paper jam. An exemplary embodiment of the ballot envelope scanner also works in connection with a workstation application to verify the presence of a barcode that matches a valid voter, store an image of the ballot envelope signature, print an endorsement on each ballot envelope with a verified barcode identifying location of such ballot envelopes, associate and store the endorsement with the signature image, and activate a solenoid to divert ballot envelopes with unrecognizable or unmatched barcodes to a separate tray for manual processing.

Thus the integrated vote by mail management system achieves the above stated objectives, eliminates difficulties encountered in the use of prior methods, solves problems, and attains the desirable results described herein.

Further objects of an exemplary form of the present invention will be made apparent in the following Best Modes for Carrying Out Invention and the appended claims.

BRIEF DESCRIPTION OF DRAWINGS

FIG. 4 is a perspective view of the front of an exemplary feed unit, with the enclosure removed.

FIG. 5 is a perspective view of the back of an exemplary feed unit, with the enclosure removed.

BEST MODES FOR CARRYING OUT INVENTION

Figure 1:
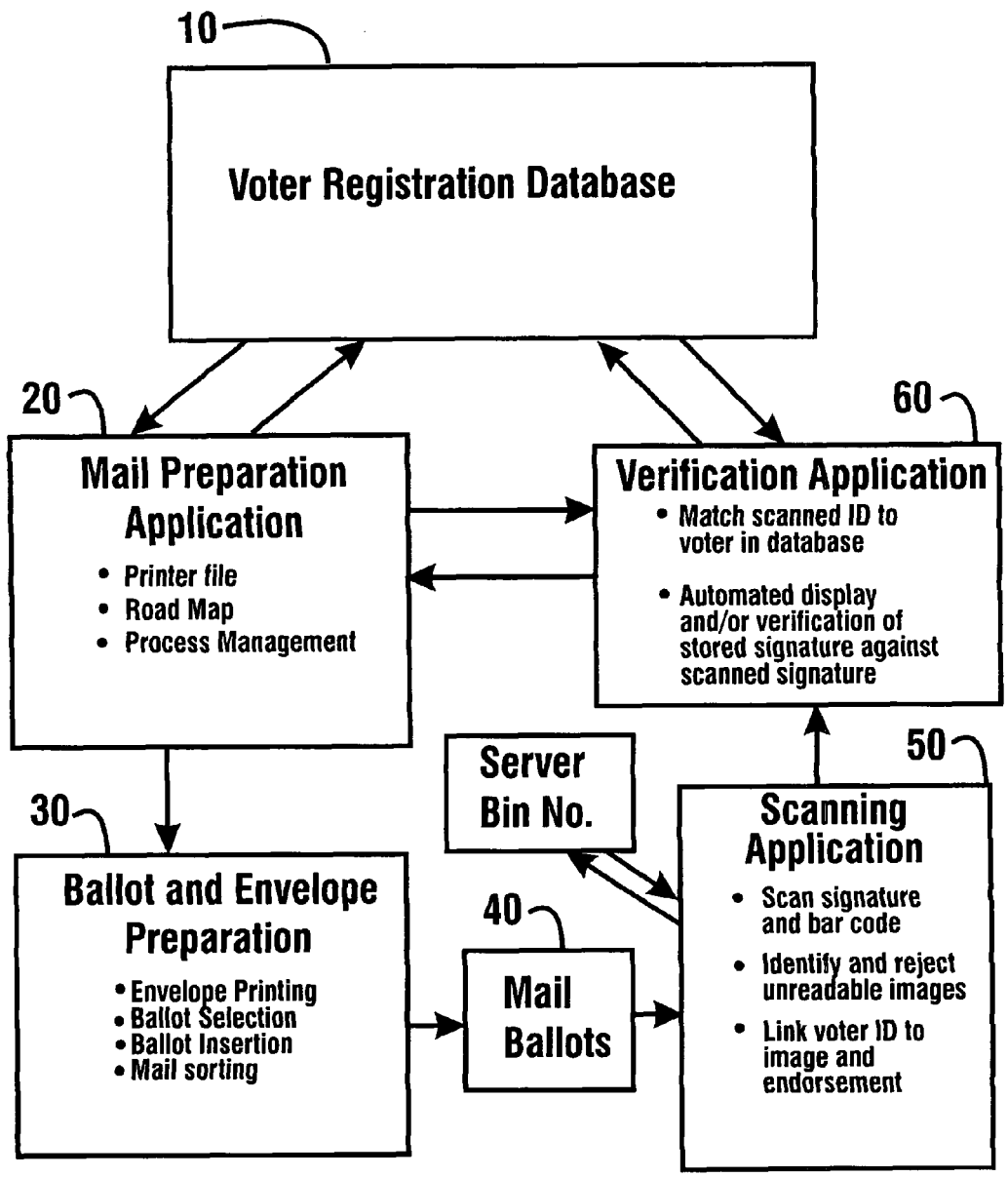
FIG. 1 is a schematic illustration of modules in an exemplary vote by mail management system.

Referring now to the drawings, and in particular to FIG. 1 contained therein is a schematic illustration of the major components of an exemplary embodiment of a vote by mail management system. In the embodiment illustrated, a jurisdiction maintains a voter registration database identified by the reference numeral 10. For each registered voter, a voter registration database 10 typically includes the voter's name, address, party affiliation, birthdate, and a signature exemplar. This database also contains sufficient information to determine which ballot each individual voter should receive in a particular election. This may be precinct and party data, or it may be rules that are applied to voter information data in order to generate a precinct or subprecinct, and party. The database may also contain information such as voting history or other information considered relevant by the voting jurisdiction, or required by law.

When an absentee or vote by mail ballot is requested, the jurisdiction electronically marks or otherwise identifies each voter who needs to be mailed a ballot. In an exemplary embodiment, this information is periodically exported from the voter registration database 10 to a mail preparation application, identified by reference number 20 in FIG. 1. An exemplary mail preparation application 20 performs a variety of tasks associated with preparing ballots for mail. This mail preparation application includes generating a printable file for each vote by mail voter that includes a mailing address, postnet barcode, and a voter number barcode; sorting the voter files into a logical ballot processing order for mailing; and creating a road map for ballot selection and insertion. In addition an exemplary embodiment of the mail preparation application 20 tracks the ballot requests processed, maintains overall project information such as crucial dates, and performs other functions related to managing, responding to, and tracking requests to vote by mail.

Once the mail preparation application 20 has created vote by mail voter files and road maps, the ballot envelopes are processed for mailing using the road map as a guide, as schematically illustrated by the box identified by reference numeral 30. This processing generally includes printing the ballot envelopes, selecting and inserting the correct ballot into each ballot envelope, and sorting the ballots by zipcode for mailing.

The ballots are then taken to a courier for delivery to the voters, in the United States ballots are generally taken to the United States Post Office. This is illustrated schematically by reference numeral 40 in FIG. 1.

As election day approaches the absentee or vote by mail voters return the ballot envelopes, including the voted ballots, to a processing location. In an exemplary embodiment a ballot envelope scanner, schematically represented by reference numeral 50, is used to capture and store information associated with each returning ballot envelope. This process, discussed in more detail below, includes using a ballot envelope scanner working in conjunction with a workstation application to scan each ballot envelope to capture and decode an identifier, such as a bar code, which associates the ballot envelope with a particular voter and to capture the signature image from the ballot envelope. Under the control of a workstation application, a ballot envelope scanner may also endorse each ballot envelope which is authenticated as associated with a particular absentee or vote by mail voter by printing a code including a voter number and numbers designating the location in which the authenticated ballot envelope will be stored. An exemplary embodiment of a ballot envelope scanner also sorts ballot envelopes whose images cannot be interpreted into a separate tray for manual processing.

In an exemplary embodiment, the work station application exports the endorsement and signature image associated with each scanned and verified ballot envelope to a signature verification application, illustrated schematically in FIG. 1 by reference numeral 60, for verification of the signature. Each record contains data corresponding to the endorsement and the scanned signature image. As discussed in more detail below, an exemplary signature verification application 60 facilitates the automated visual comparison of the signature on file with the signature on the ballot envelope. In an exemplary embodiment, the signature verification application 60 will locate the stored signature image which is associated with the same voter number as is a particular scanned image from the voter registration database 10. Generally the necessary data voter registration database information is exported directly from the voter registration database 10, but in some exemplary embodiments it may be exported from the mail preparation application 20.

The file and scanned images may be automatically displayed side by side for visual verification or may be processed by an automated signature recognition subroutine. An exemplary embodiment of the signature verification application 60 may permit each jurisdiction to choose between these and other options. If the signatures do not match, the endorsement information may be used to locate the ballot envelope that is associated with the signature that cannot be verified so that the election officials may investigate and resolve the matter. In some embodiments, data from verified scanned signatures may be integrated with the original signature file in the voter registration database 10 in order to provide for more accurate signature matching over time.

Figure 2:
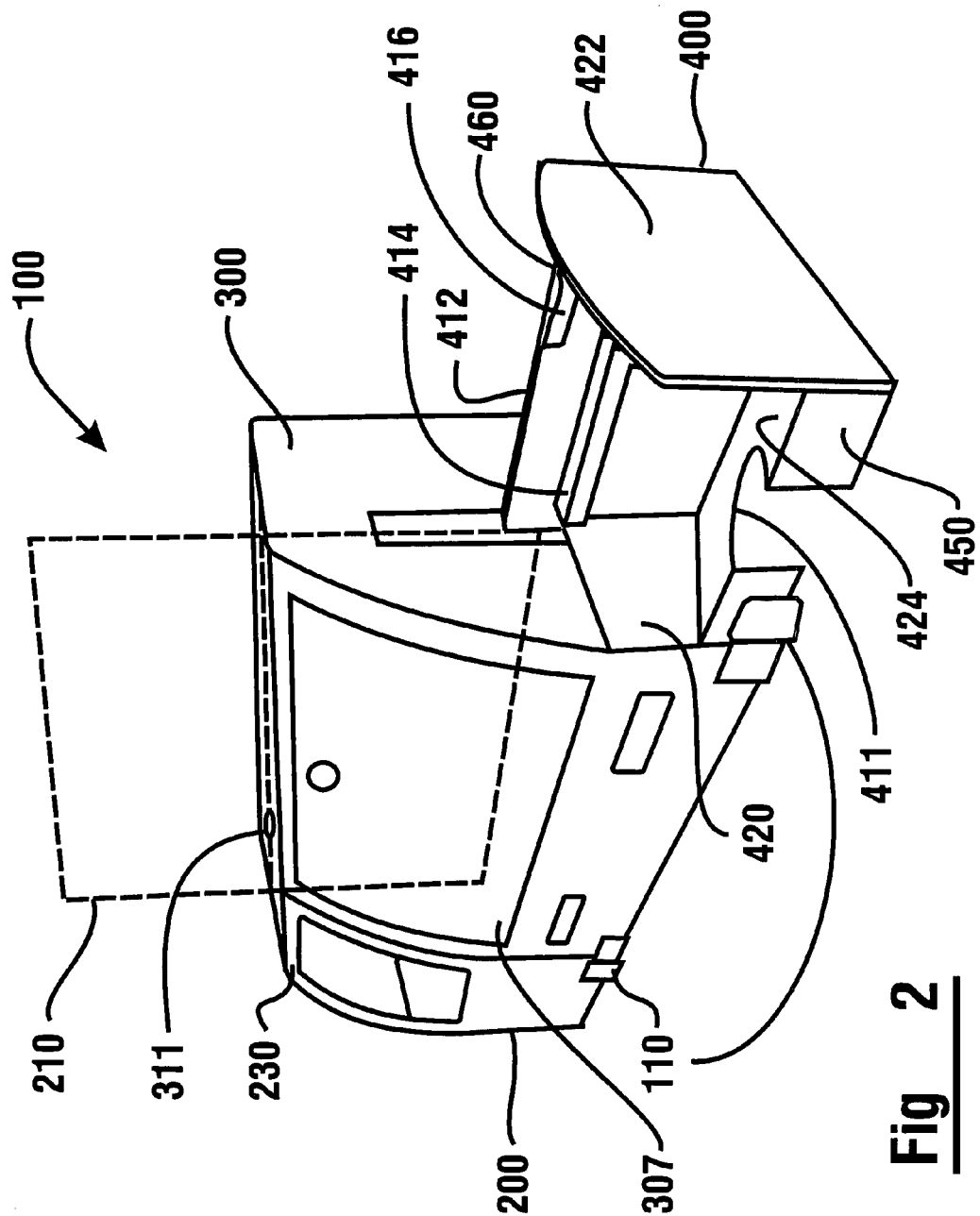
FIG. 2 is a perspective view of an exemplary ballot envelope scanner.
Figure 14:
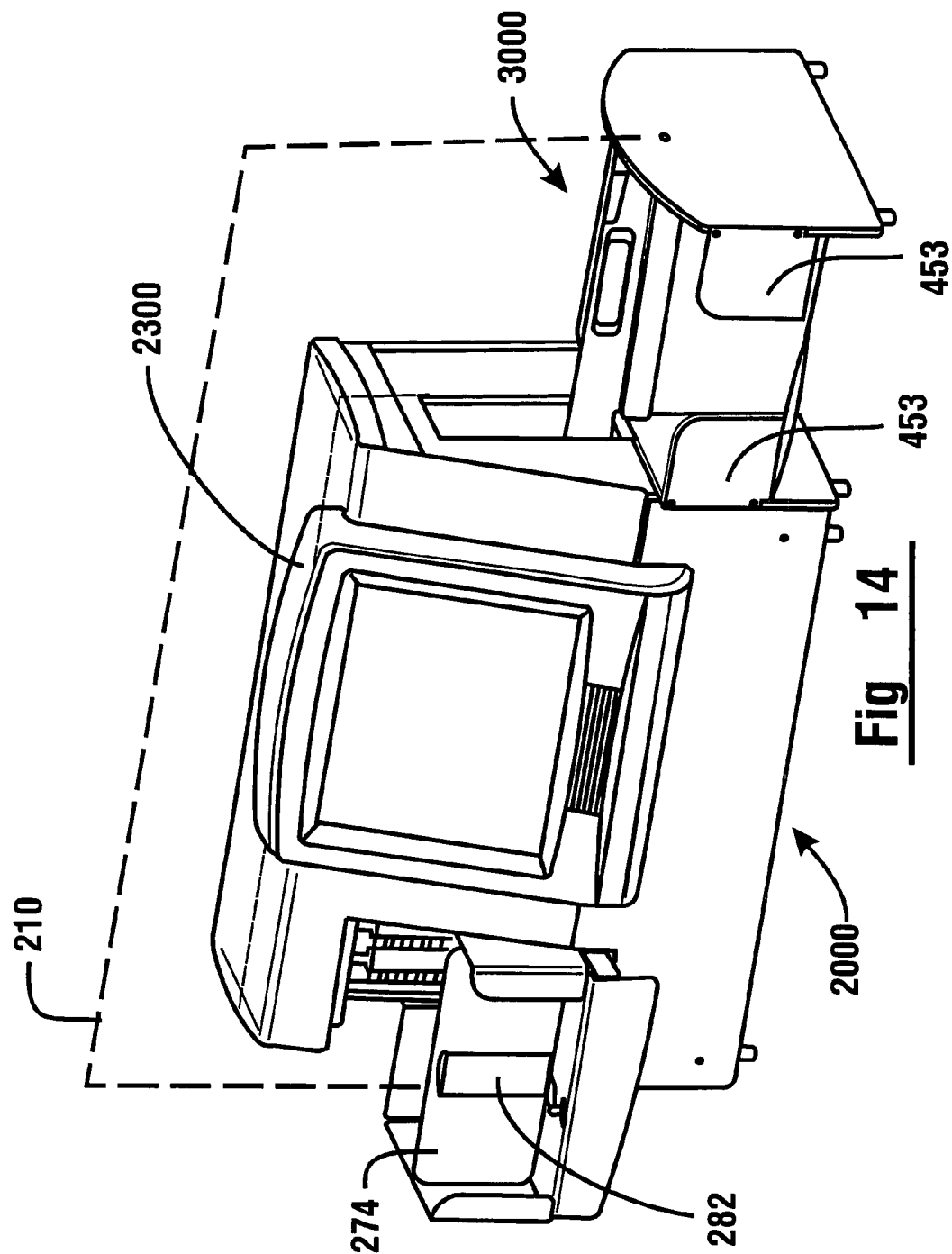
FIG. 14 is a perspective view of an exemplary ballot envelope scanner.

Exemplary embodiments of ballot envelope scanners are illustrated in FIGS. 2 and 14, and are generally referred to by reference numeral 100. A first exemplary embodiment of a ballot envelope scanner 100, illustrated in FIG. 2, includes three units: a feed unit 200, a processing unit 300, and an output unit 400. A second exemplary embodiment of a ballot scanner 100, illustrated in FIG. 14, includes two units: a combined feed and processing unit 2000 and an output unit 3000. Because the units may be separate or combined, the parts of the ballot envelope scanner 100 representing the feed, processing, and output units are also referred to herein the feed, processing, and output portions. The units of the exemplary embodiment of a ballot envelope scanner 100 illustrated in FIGS. 2 and 14 may be separated for storage or transportation. The ballot envelope scanners 100 are characterized by a paper path 210, illustrated in phantom in FIGS. 2 and 14, that is vertical and straight through the ballot envelope scanner 100, so long as the ballot envelope can be authenticated as being associated with a registered voter. If the ballot envelope cannot be authenticated, the ballot envelope is diverted slightly at the end into a separate tray for manual processing.

Figure 13:
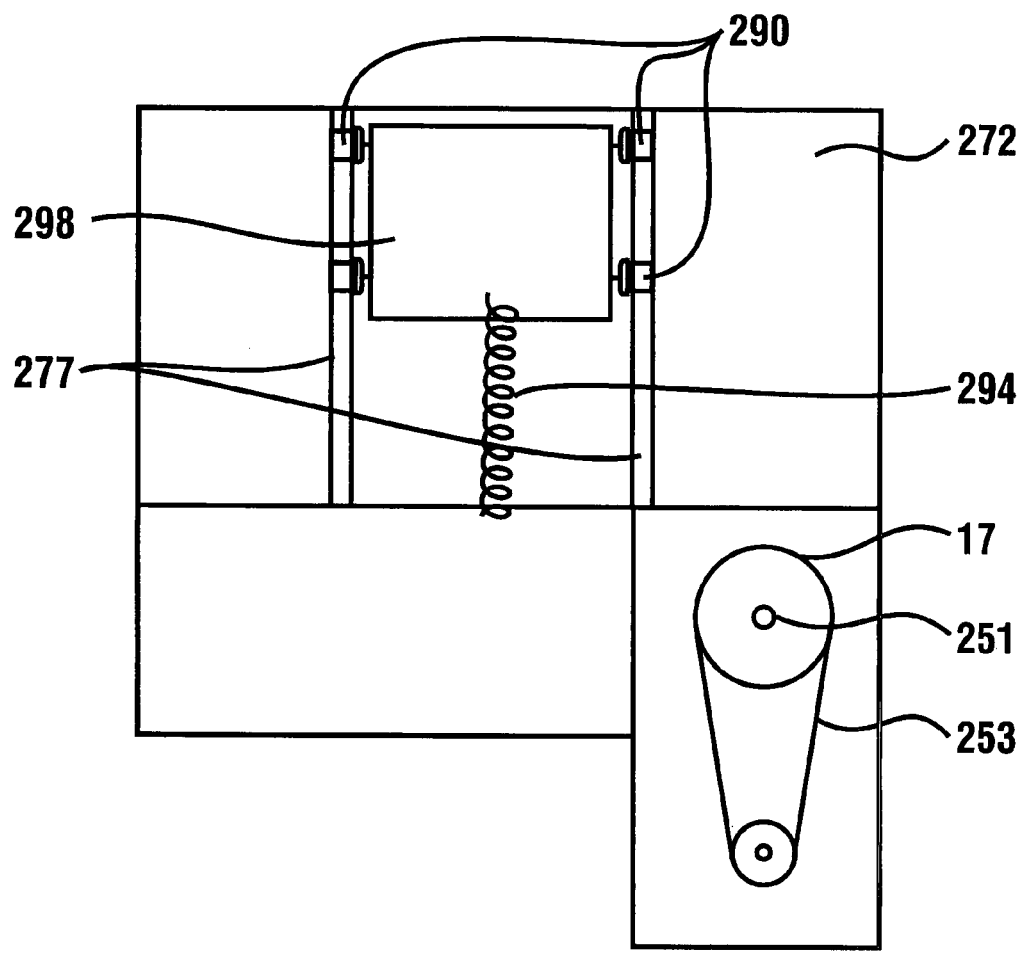
FIG. 13 is a view from below of portions the feed unit illustrated in FIGS. 4 and 5.

An exemplary feed unit 200 of a first exemplary embodiment of a ballot envelope scanner 100 as illustrated in FIGS. 4 and 5 comprises a driving portion 240, a feed tray 270, and an enclosure 230 (identified in FIG. 2). The driving portion 240 includes a vertical driving feed roller 250, which is adjacent a plurality of vertical clutched feed rollers 252, which are aligned with each other. Each feed roller 250, 252 is associated with a driveshaft 251. As illustrated separately in FIG. 13, the exemplary feed roller 250 may be driven by a feed motor 254 (visible in FIG. 5) through a drive belt 253 which is operatively connected to a reduction gear 17 that is affixed to the driveshaft 251 of the drive roller 250. In an exemplary embodiment, the driving feed roller 250 is operatively connected by a drive belt 253 to the driveshaft 251 of an adjacent clutched feed roller 252 to drive the clutched feed roller 252 at the same rotational speed as driving feed roller 250. Similarly, in an exemplary embodiment, each clutched feed roller 252 is connected with the driveshaft 251 of adjacent feed rollers 252 on either side so that the driving feed roller 250 and the clutched feed rollers 252 are all rotating at the same speed. The driveshaft 251 of each clutched feed roller 252 is operatively adapted with a clutch 258 so that it may rotate freely in its normal rotational direction. While in the exemplary embodiment illustrated in FIG. 2 some of the rollers 251, 252 are clutched, if the speed of the ballot envelope through the ballot envelope scanner 100 is to be uniform, clutches may be omitted, such as in the exemplary embodiment illustrated in FIGS. 14-18.

In the exemplary embodiment illustrated the driveshafts 251 of feed rollers 250, 252 pass through a frame 244, made from generally rectangular structural elements 220, which holds the feed rollers 250, 252 in alignment with each other along the paper path 210. In the exemplary embodiment illustrated, the aligned feed rollers 250, 252 have a front side 262 and a back side 264. Adjacent and parallel to the feed rollers 250, 252 on a back side 264 is an exhaust fan 260, which is operative to pull air from the front side 262 of the feed rollers 250, 252, through the feed rollers 250, 252.

In the exemplary embodiment illustrated, on a front side 262 of the feed rollers 250, 252 is a feed tray 270. A feed tray 270 comprises feed bed 272 and a vertical stabilizer 274. In an exemplary embodiment, a feed bed 272 comprises two horizontal plates 276 which are parallel and aligned with each other, but are separated by a gap 278 characterized by a width 279. The upper and lower surface of each horizontal plate 276 includes a groove 277 which is parallel to and adjacent to a gap 278 and which is adapted to serve as a track for a vertical stabilizer 274.

A vertical stabilizer 274 comprises a vertical plate 280 affixed to a follower element 282. In the exemplary embodiment illustrated, a follower element 282 includes an L-shaped bracket 284 having a horizontal portion 286 and a vertical portion 288. In the exemplary embodiment illustrated, the vertical portion 288 is a vertical plate, the bottom of which is generally aligned with a lower edge of vertical plate 280. As illustrated, the horizontal portion 286 is generally aligned with the gap 278 in the feed bed 272. In the exemplary embodiment illustrated, the horizontal portion 286 comprises two spaced apart parallel plates 296, 298, separated by a gap. The upper horizontal plate 296 has a width which is slightly larger than gap 278 and the lower horizontal plate 298 has a width that is slightly less than the width 279 of the gap 278. A pair of axles 292 passes horizontally through each horizontal plate 296, 298, oriented in parallel to vertical plate 280. A rimmed wheel 290 is attached to each end of each axle. The wheels 290 associated with the upper horizontal plate 296 are operatively adapted to use a groove 277 in the upper surface of the feed bed 272 tracks and the wheels 290 associated with the lower horizontal plate 298 are adapted to use the groove 277 in the lower surface of the feed bed 272 to permit the vertical stabilizer 274 to roll toward or away from the aligned feed rollers 250, 252 in a controlled manner. In the exemplary embodiment illustrated a follower element 282 may be biased toward the feed rollers 250, 252 by means of a biasing element 294, such as a tension spring, illustrated from below in FIG. 13.

Although a particular exemplary embodiment of a feed unit and components thereof are described herein, the specifics are provide for illustration and not limitation, and equivalents thereof may be substituted. For example, follower element 282 may have a different shape, as illustrated in FIG. 14, so long as it is biased to assist the vertical stabilizer 274 to remain vertical and to follow the ballot envelopes toward the feed rollers; the follower element 282 may not include wheels both above and below the feed bed, or may not include wheels at all; and the follower element 282 may be biased by some means other than a spring that is known to those skilled in the art. In a second exemplary embodiment illustrated in FIG. 14, the follower element is biased 282 using a constant pressure spring, similar to the springs designed to retract tape measures. Although a single driving roller 250 is illustrated in FIG. 4 as driving five clutched feed rollers 252, it may drive more or fewer than five clutched feed rollers. Similarly, although the single driving roller 250 is illustrated in FIG. 4 as being positioned at the trailing edge of the ballot envelope in other embodiments it may be placed in a different location. In the exemplary embodiment illustrated in FIG. 15, for example, the driving roller 250 is at the leading edge of the ballot envelope.

Figure 6:
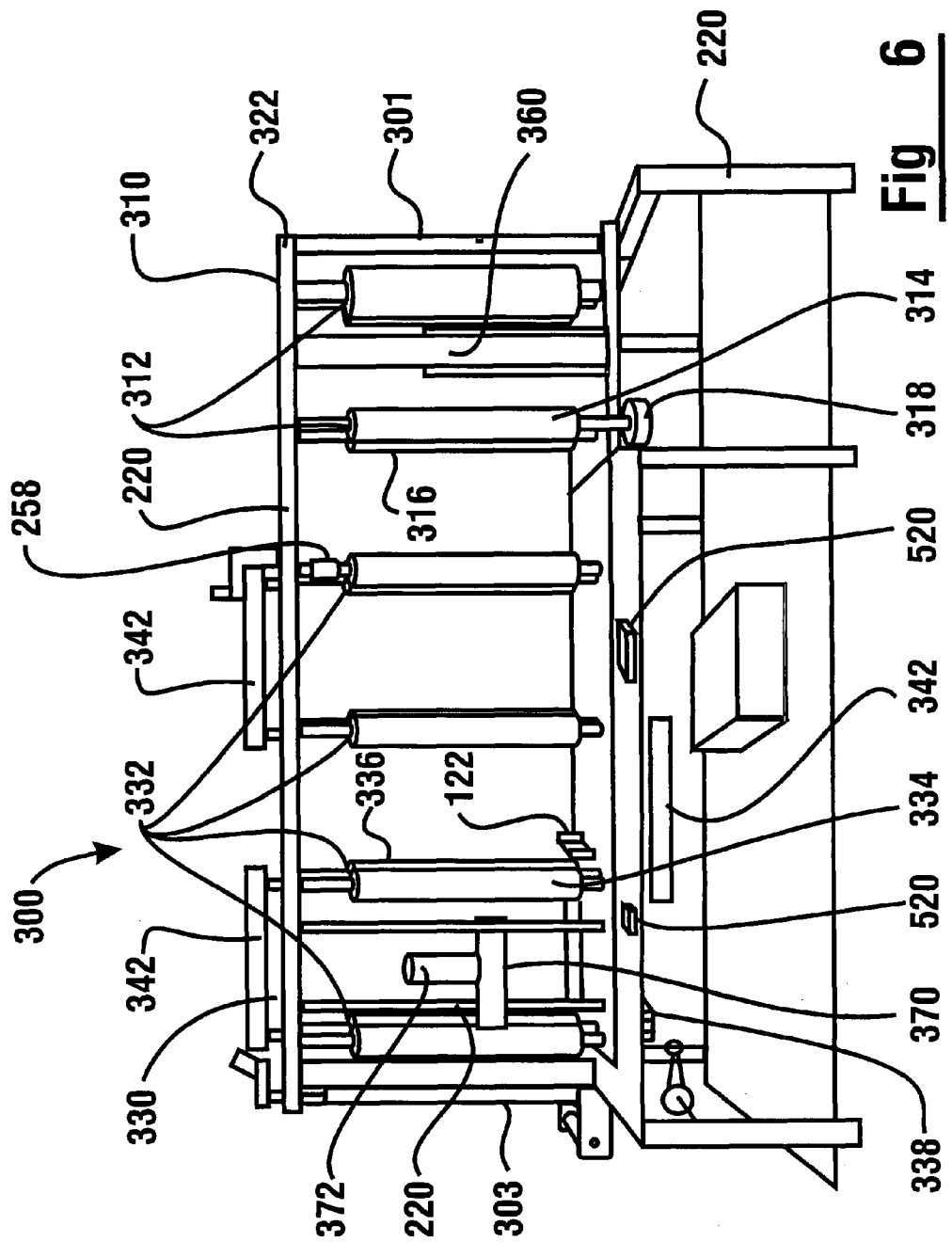
FIG. 6 is a rear perspective view of a processing unit with the enclosure removed.
Figure 9:
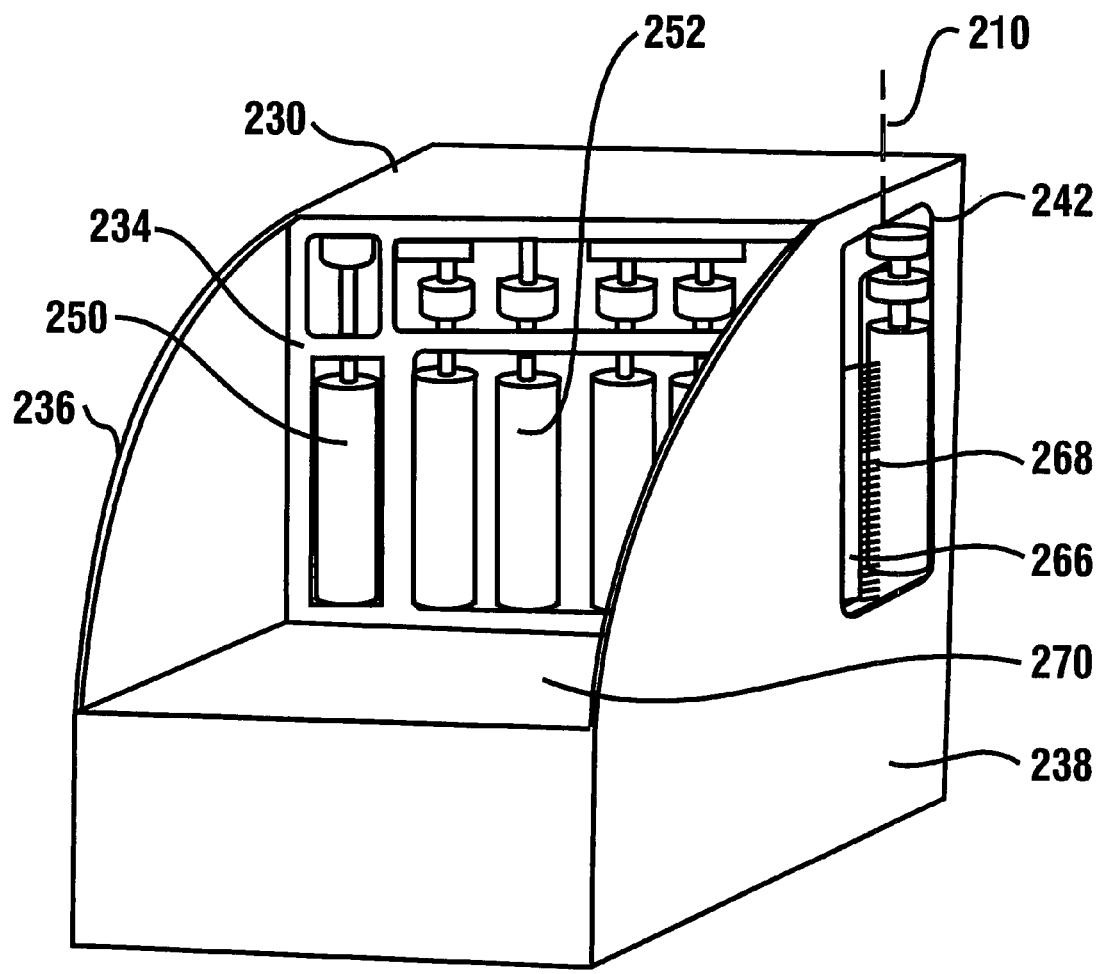
FIG. 9 is a perspective view of a feed unit enclosure from the output side.

The functional portions described above of the feed unit 200 are positioned by attachment to a plurality of joined rectangular structural elements 220 which are generally parallel or perpendicular to each other, additional examples of which may be seen in FIG. 6. The functional portions of the feed unit 200 described above are contained in an enclosure 230, illustrated in FIG. 9, the main portion of which is generally L shaped, with the feed tray 270 forming the upper surface 232 of the lower leg of the L, and the aligned rollers 250, 252 adjacent the plane of the inner surface 234 of the upper leg of the L. The first and second ends 236, 238 of an exemplary enclosure 230 include curved extensions which connect the upper leg of the L to the lower leg of the L.

In an exemplary embodiment of an enclosure 230, a portion of the inner surface 234 is open to permit operative contact between the rollers 250, 252 and the ballot envelopes being processed. The second end 238 of the enclosure 230 includes an elongated output slot 242 through which ballot envelopes exit the feed unit 200. The output slot 242 is vertical and the vertical center line of the output slot 242 is aligned with paper path 210. In the exemplary embodiment illustrated an elongated brush 266 is affixed to the edge of the output slot 242 which is farthest from the rollers 250, 252 and has a leading edge 268 which extends to the paper path 210. Although in this embodiment an elongated brush 266 is used to prevent double feeds, in other embodiments equivalent mechanisms may be substituted, such as a flexible flap which extends into the output slot 242 to the paper path 210 to discourage a second ballot envelope from being pulled through the output slot 242. In addition, an elongated brush 266, or its equivalent, may be used alone or with the waffle technology illustrated and described in FIG. 15.

Figure 12:
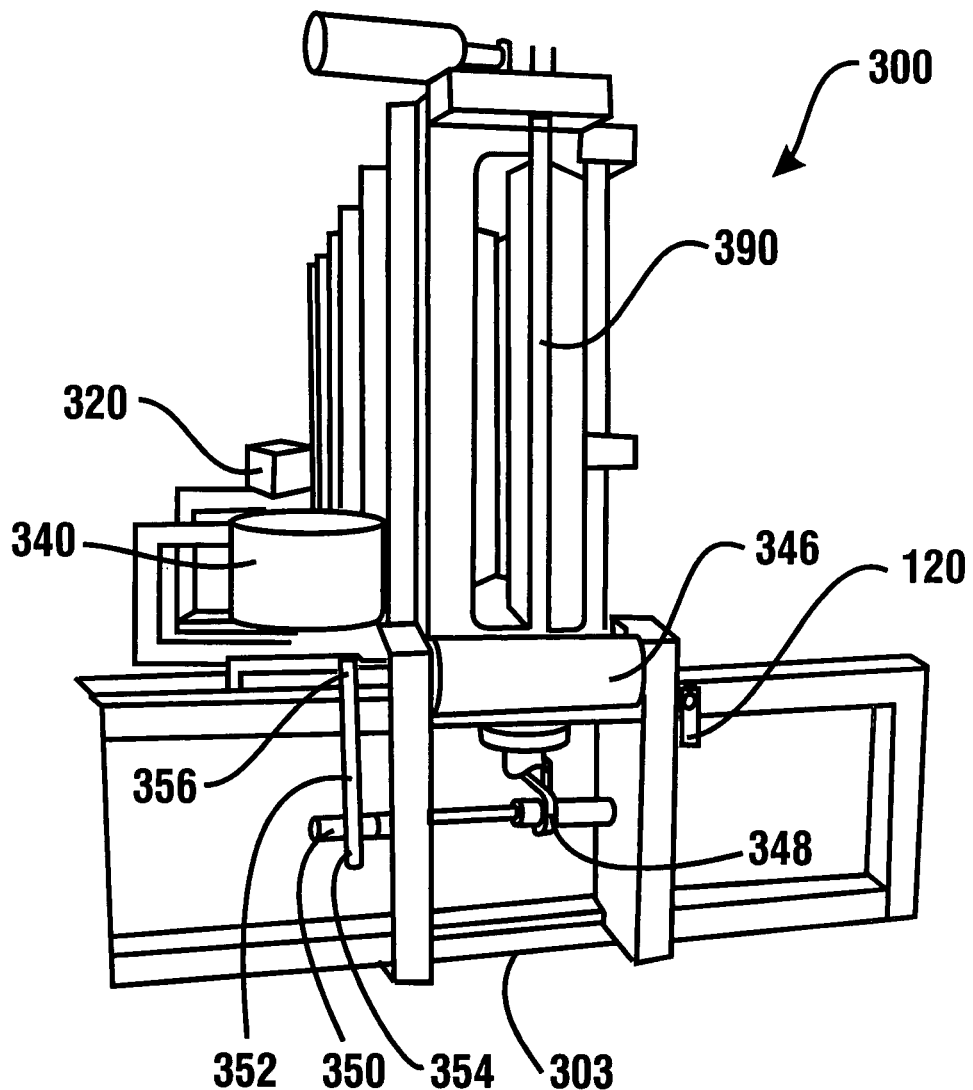
FIG. 12 is a perspective view from the output end of the processing unit.

An exemplary embodiment of a ballot envelope scanner 100 also includes a processing unit 300, and exemplary embodiments of which are illustrated in FIGS. 6 and 12. A processing unit 300 includes first and second drive modules 310, 330, a scanning module 360, an endorsement module 370 and an error diverter 390. An exemplary processing unit 300 includes an input end 301, adjacent the feed unit 200, and an output end 303, adjacent the output unit 400. In some exemplary embodiments, a computer 2300 may be affixed to the processing unit 300, for running the work station application 500, as described and illustrated in FIG. 14. Although described specifically in connection with the exemplary embodiment illustrated in FIG. 14, the description and illustration are intended to be exemplary, not limiting, and affixing a computer to the exemplary processing unit 300 illustrated in FIG. 4 is specifically contemplated.

A first drive module 310 of an exemplary processing unit 300 illustrated in FIG. 6 includes a plurality of pairs of rollers 312 and a first drive motor 320 (visible in FIG. 12). In this exemplary embodiment the first drive module 310 includes two pairs of rollers 312, but in other embodiments it may contain more than two pairs. Each pair of rollers 312 includes a drive roller 314 and a follower roller 316. A first drive motor 320 is operatively connected to the driveshaft 315 of one drive roller 314 by a drive belt 318. Each additional drive roller 314 is operatively connected by a drive belt 322 to an adjacent drive roller 314.

Figure 7:
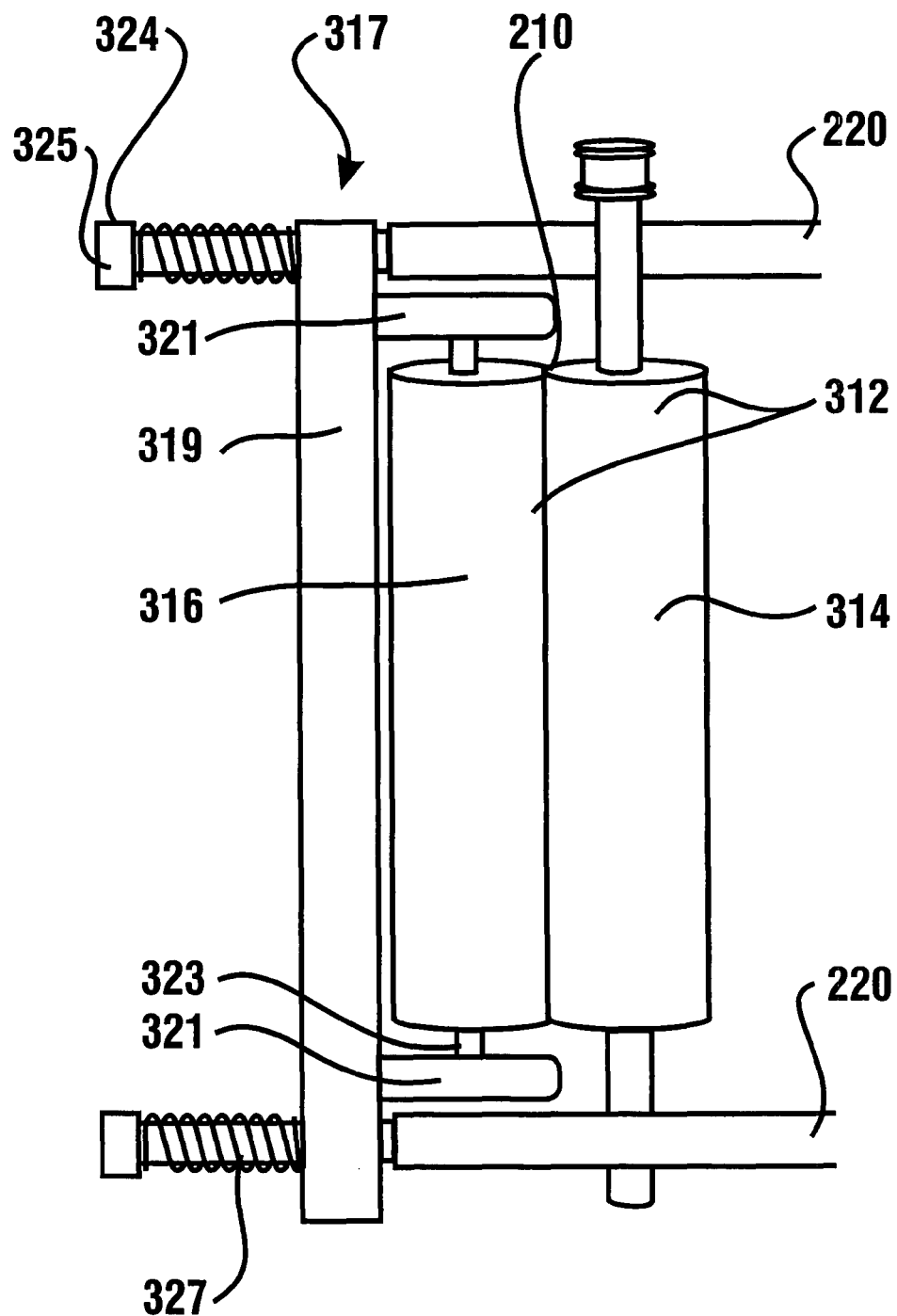
FIG. 7 is a view of a carrier and biasing element.

As illustrated in FIG. 7, the follower roller 316 in each pair is held by a carrier 317 which permits it to rotate freely and which is biased toward its drive roller 314 by a plurality of biasing elements 324. An exemplary embodiment of a carrier 317 includes a vertical element biasing element 324. An exemplary carrier 317 includes a vertical plate 319 with spaced apart horizontal extensions 321 through which an axle 323 rotatably holds roller 316. Bolts 325 are passed through holes in the upper and lower portions of plate 319 and are fixed to a rectangular structural element 220, through which rectangular structural element 220 the driveshafts 315 of drive rollers 314 pass. On the side of the vertical plates 319 opposite the drive roller 314, each of the bolts 325 is surrounded by a compression spring 327, which acts as biasing element 324 and which is compressed between the head of bolt 325 and plate 319 by the passage of a ballot envelope between the associated pair of rollers 312.

In the exemplary embodiment illustrated the follower roller 316 is made to hold the passing ballot envelope because of a bias created by a plurality of compressed springs. In other exemplary embodiments, this function may be created by other means known to those skilled in the arts for creating a bias to urge the follower roller 316 toward its paired drive roller 314.

The pairs of drive rollers 312 are spaced and are aligned along the paper path 210, with each drive roller 314 aligned with the feed rollers 250, 252 in the feed unit 200 when the feed unit 200 and the processing unit 300 are operatively connected. In an exemplary embodiment, each follower roller 316 is aligned adjacent its drive roller on the opposite side of the paper path 210.

In an exemplary embodiment illustrated in FIG. 6, a second drive module 330 is similar to the first drive module 310, and includes a plurality of pairs of rollers 332 and a second drive motor 340 (visible in FIG. 12). In this exemplary embodiment the second drive module 330 includes four pairs of vertical rollers 332 rollers, but in other embodiments it may contain fewer or more pairs. Each pair of rollers 332 includes a drive roller 334 and a follower roller 336. A second drive motor 340 is operatively connected to the driveshaft 335 of one drive roller 334 by a drive belt 338. Each additional drive roller 334 is operatively connected by a drive belt 342 to an adjacent drive roller 334. In an exemplary embodiment, one or more drive roller 334 in the second drive module 330 may be operatively connected to a clutch 358 so that they can rotate freely in the direction the ballot envelopes are moving to permit varying the speed between the roller clusters.

As with the feed portion 200 of the exemplary embodiment discussed herein, if a uniform speed through the ballot envelope scanner 100 is desired, the drive rollers may not incorporate clutches.

The follower roller 336 in each pair is biased toward its drive roller 334 by a plurality of biasing elements 344 (not separately illustrated), in a manner similar to that described above for the first drive module 310. The pairs of drive rollers 332 are spaced and are aligned along the paper path 210, with each drive roller 334 aligned with the feed rollers 250, 252 in the feed unit 200 when the feed unit 200 and the processing unit 300 are operatively connected. Note that in another exemplary embodiment, illustrated in FIG. 14, the feed unit 200 and the processing unit 300 are combined into a single feed and processing unit while retaining the alignment of the rollers to preserve the straight path through the ballot envelope scanner. In an exemplary embodiment, each follower roller 336 is aligned adjacent its drive roller 334 on the opposite side of the paper path 210.

In addition, as illustrated in this exemplary embodiment the second drive module 330 includes a horizontal kick roller 346, shown in FIG. 12, at the output end 303 of the processing unit 300, approximately level with the base of the rollers 332. The kick roller 346 is driven by the second drive motor 340.

Using a belt 348 as illustrated in FIG. 12, the vertical rotation is transformed to horizontal rotation of an independent driveshaft 350, and the rate of rotation increased slightly using a second belt 352 operably connected to a gear 354 on the independent driveshaft 350 to a slightly smaller gear 356 (a reduction gear) on the driveshaft 357 of the kick roller 346. In other exemplary embodiments, kick roller 346 may also be driven by a separate motor.

Figure 3:
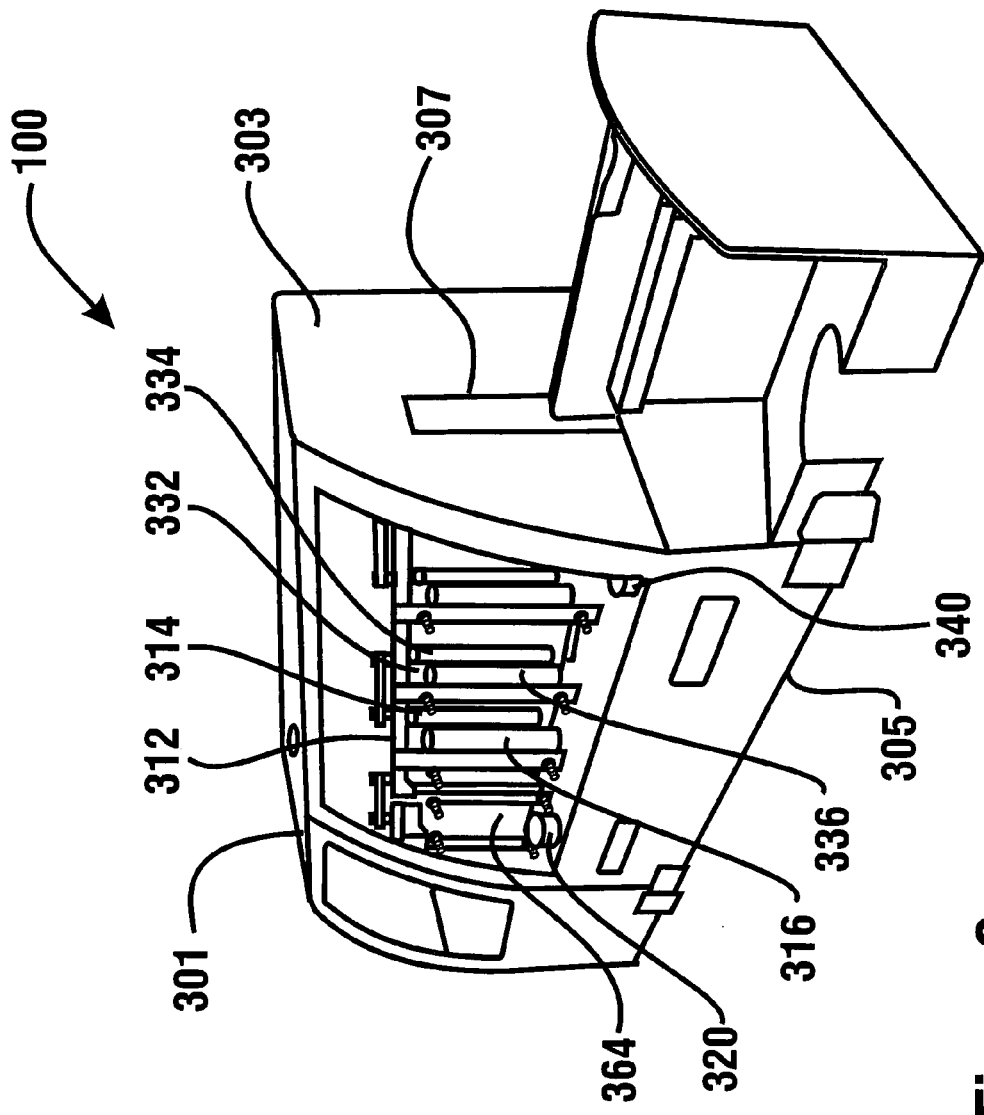
FIG. 3 is a perspective view of an exemplary ballot envelope scanner with the front plate of the processing unit removed.
Figure 10A:
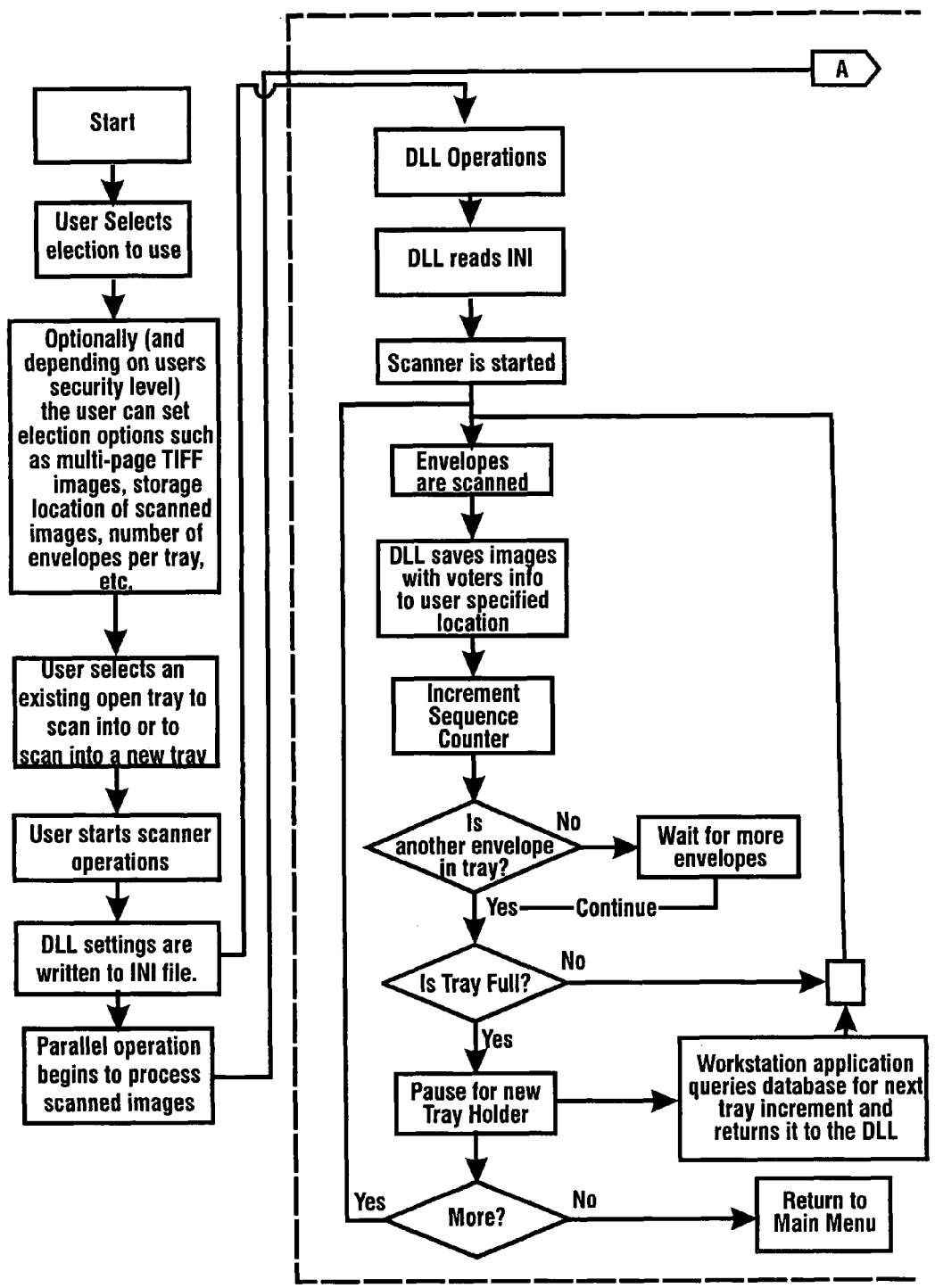
FIGS. 10A and 10B show schematic illustration of the work flow and interaction between a workstation application, on-board processors, and an exemplary ballot envelope scanner.
Figure 10B:
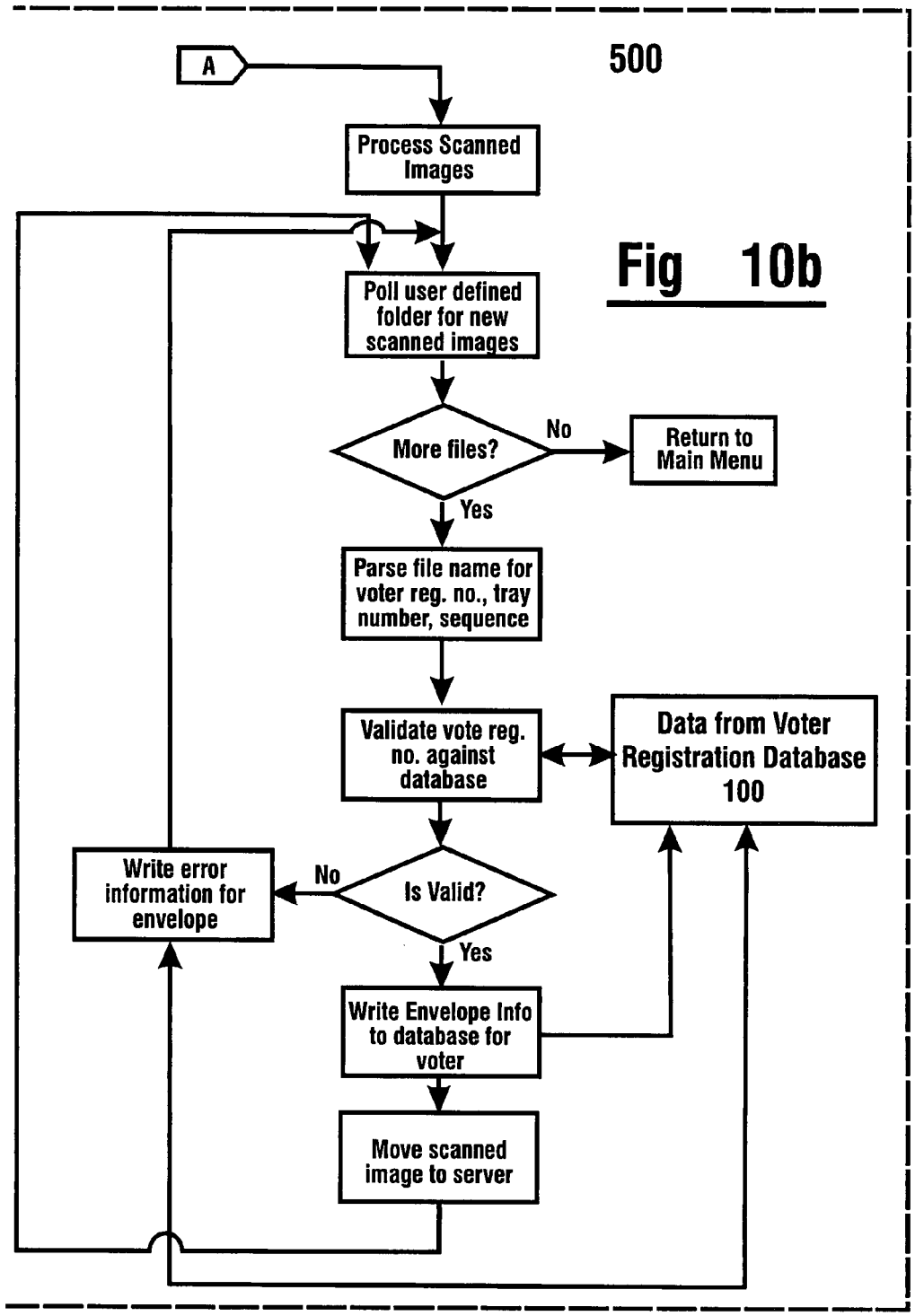

The scanning module 360 of the processing unit 300 comprises a scanner 362, shown from the rear in FIG. 6, and a platen 364, shown in FIG. 3. Scanners 362 are well known in the art, and a variety of commercially available scanners may be used. In one exemplary embodiment, a yellow green LED scanner is used. In other exemplary embodiments scanners with a different light source, or different color light may be used. An exemplary platen 364 is a plate 366 that is bent into a rectangular "U" shape with lips on each side that are attached to the structure that holds the follower rollers. The base of the U extends inward between the follower rollers 316 of the first drive module 310, and holds the ballot envelope 510 against the surface of the scanner 362. The surface of the base of the U is aligned with the surface of the follower rollers 316 adjacent to the paper path 210. The scanner 362 is operatively connected to an on-board processor 520. The on-board processor 520, schematically illustrated in FIG. 6, is adapted to receive and transmit data to a workstation application, and to carry out instructions transmitted to it from the work station application 500, the functions of which are described in more detail below and are illustrated in FIG. 10. It should be noted that although the exemplary embodiment illustrated and described in FIG. 4 includes a single image scanner, the exemplary embodiment illustrated and described in FIG. 14 includes both an image scanner 361 and a bar code scanner 363. Using a separate bar code scanner 363 eliminates the need to translate an image into the bar code equivalent before comparing to stored voter numbers. The specific configurations described in connection with FIGS. 4 and 14 are exemplary and either scanner configuration is expressly contemplated for use with either embodiment, or with other equivalent exemplary embodiments of the ballot envelope scanner 100 described herein.

An exemplary embodiment of an endorsement module 370 of a processing unit 300 illustrated in FIG. 6 comprises a print head 372 and in operative connection with an on-board processor 520. In the exemplary embodiment shown, the print head 372 is of the ink jet type and produces dot matrix characters. In other embodiments, the print head 372 may be of a different type and may produce characters other than dot matrix. In the exemplary embodiment illustrated, the print head 372 is located between a pair of drive rollers 352 in the second drive module 350, with the printing element of the print head 372 adjacent the paper path 210. The print head 372 is operatively connected to an on-board processor 520. The on-board processor 520 is adapted to receive and transmit data to and from a workstation application 500, and to carry out instructions transmitted to it from the work station application 500 to control the timing and content of what is printed. The print head 372 is releasably connected to the structural framework 220 which supports the rollers 312, 332, so that the print head 372 may be selectively positioned vertically.

Figure 8:
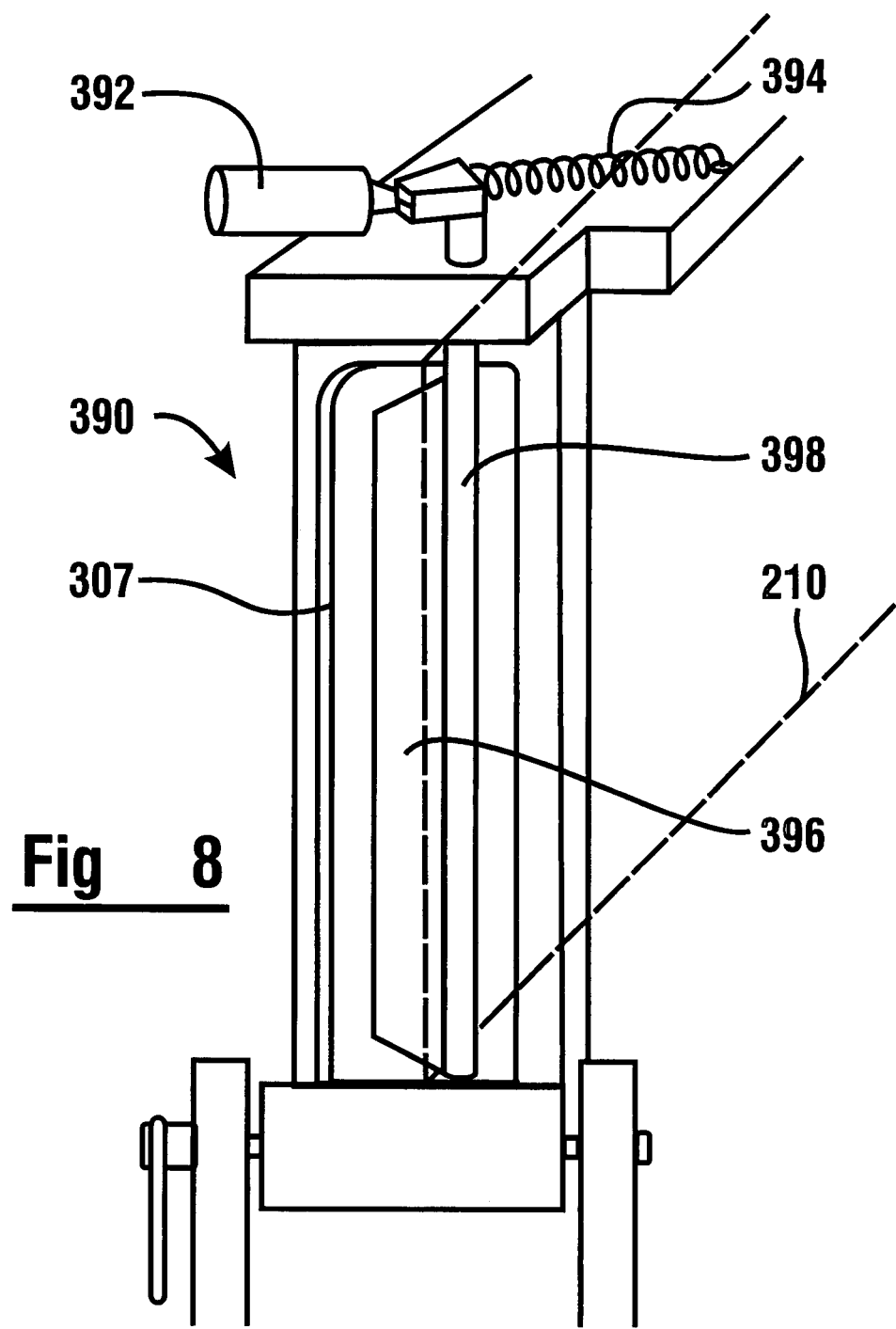
FIG. 8 is a view of a diverter plate.

In an exemplary embodiment illustrated in FIG. 8, an error diverter 390 comprises a solenoid 392, a biasing element 394, and a diverter plate 396. An exemplary diverter plate 396 is rectangular and slightly longer than the height of the ballot envelopes 510 being processed, and may be attached to a rod 398 which is rotatably connected to the solenoid 392. As illustrated in FIG. 8, the diverter plate 396 may be oriented vertically and positioned adjacent the paper path 210, shown in phantom, and may be biased by means of a biasing element 394, such as a tension spring, to remain out of the paper path 210 during normal operation. In the exemplary embodiment illustrated, a solenoid 392 is operatively connected to an on-board processor 520, shown in FIG. 6. The on-board processor 520 is adapted to receive and transmit data to and from a workstation application 500, and to carry out instructions transmitted to it from the work station application 500 to selectively rotate the rod 398 move the diverter plate 396 into the paper path 210, which diverts the end of paper path 210 from the straight line it had been following. Although the error diverter 390 is described as having a specific exemplary structure and elements, other exemplary embodiments will be apparent to those skilled in the art which selectively bend the end of the path of the ballot envelope in response to a command to do so from the work station application 500.

The functional features of the processing unit described above are generally positioned and held in place by a plurality of rectangular structural elements 220, which are arranged in parallel or perpendicular relation to one another. An enclosure 305, shown in FIG. 3, loosely surrounds the portions of the processing unit 300 described thus far, and has input and output ends 301, 303 containing elongated vertical openings 307 which are aligned with the paper path 210 and adapted to permit the passage of ballot envelopes. The shape of enclosure 305 is adapted to conform to the shape of enclosure 230 of the feed unit 200 so that when fastened together the feed unit 200, processing unit 300, and output unit present the appearance of a single piece of equipment. The particular profile of the enclosure 305 is not critical to its function. Two profiles are illustrated, one in FIG. 4 and one in FIG. 14. Additional profiles which cover the working elements of the processing unit 300, or equivalent thereof in a combined feed and processing unit 200 to prevent injury will be apparent to those skilled in the art. In addition as noted above, the profile of enclosure 305 may include a computer 2300 to consolidate the work station application 500 with the ballot envelope scanner 100.

An exemplary embodiment of the output unit 400 comprises a ballot envelope tray 410, partitioned into an accepted tray 450 and a rejected tray 460, illustrated most clearly in FIG. 2. The tray 410 includes a vertical shared wall 412 in the center of the tray 410, which is approximately aligned with the feed rollers 250, 252 in the feed unit 200 and the drive rollers 314, 334 in the processing unit 300. In the exemplary embodiment illustrated, at each end of the shared wall 412 are first and second end walls 420 and 422. These walls are vertical, are perpendicular to the shared wall 412, and are positioned relative to the shared wall 412 so that when viewed from above the walls 412, 420, 422 form an "I" shape. A floor 424 connects all three walls 412, 420, 422. The floor 424 declines on each side toward the shared vertical wall 412.

In the exemplary embodiment illustrated, a horizontal guide rail 414 is affixed at approximately the level upper surface of the kick roller 346 along each side of the shared wall 412. Also affixed to each side of the shared wall 412, near the second end wall 422 of the output unit 400 is a flipping element 416. The flipping element 416 comprises a triangular wedge, with the narrow end of the wedge closest to the processing unit 300. Although the flipping element 416 is described in exemplary fashion as comprising a triangular wedge, the flipping element may comprise other exemplary embodiments such as a curved, downwardly sloping rail molded into the shared wall 412 to urge the envelope to turn downward into the tray 450, 460. Other equivalent exemplary embodiments will be apparent to those skilled in the art.

The top of the first end wall 420 is approximately aligned with the top of kick roller 346. The shared wall 412 and the second end wall 422 are somewhat taller. In the exemplary embodiment illustrated, the floor 424 in each side of the partitioned tray 410 includes a cutout portion 411 to make it easier to grip the piles of ballot envelopes which accumulate thereon. In other exemplary embodiments, additional equivalent variations may be present, such as tray walls 453 for trays 450 and 460 as illustrated in exemplary fashion in FIG. 14.

As may be seen in FIG. 2, in an exemplary embodiment, the three units that comprise ballot envelope scanner 100 are each adapted with releasable attachment parts 110 to permit the feed unit 200, the processing unit 300, and the output unit 400 to be attached together to form a single functional device. In FIG. 14, the combined feed and processing units 2000 and the output unit 3000 form a single functional unit. As illustrated in exemplary fashion in FIG. 2, the attachment parts 110 are latches. Another exemplary embodiment is keyhole slots in one unit paired with shoulder screws in adjacent units. Other means for attaching units together will be apparent to those skilled in the art.

Figure 16:
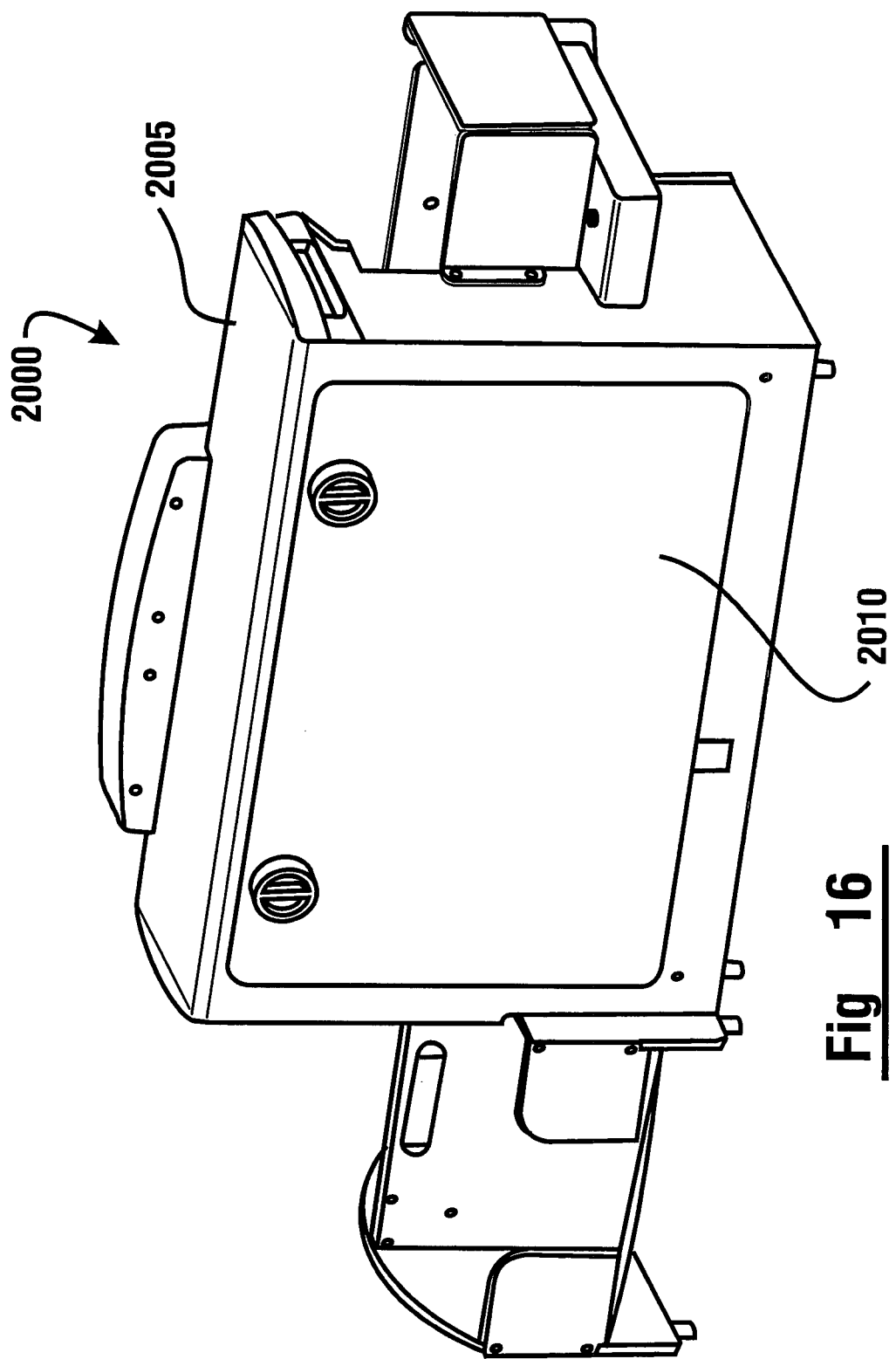
FIG. 16 is perspective rear view of the exemplary ballot envelope scanner illustrated in FIG. 14.
Figure 17:
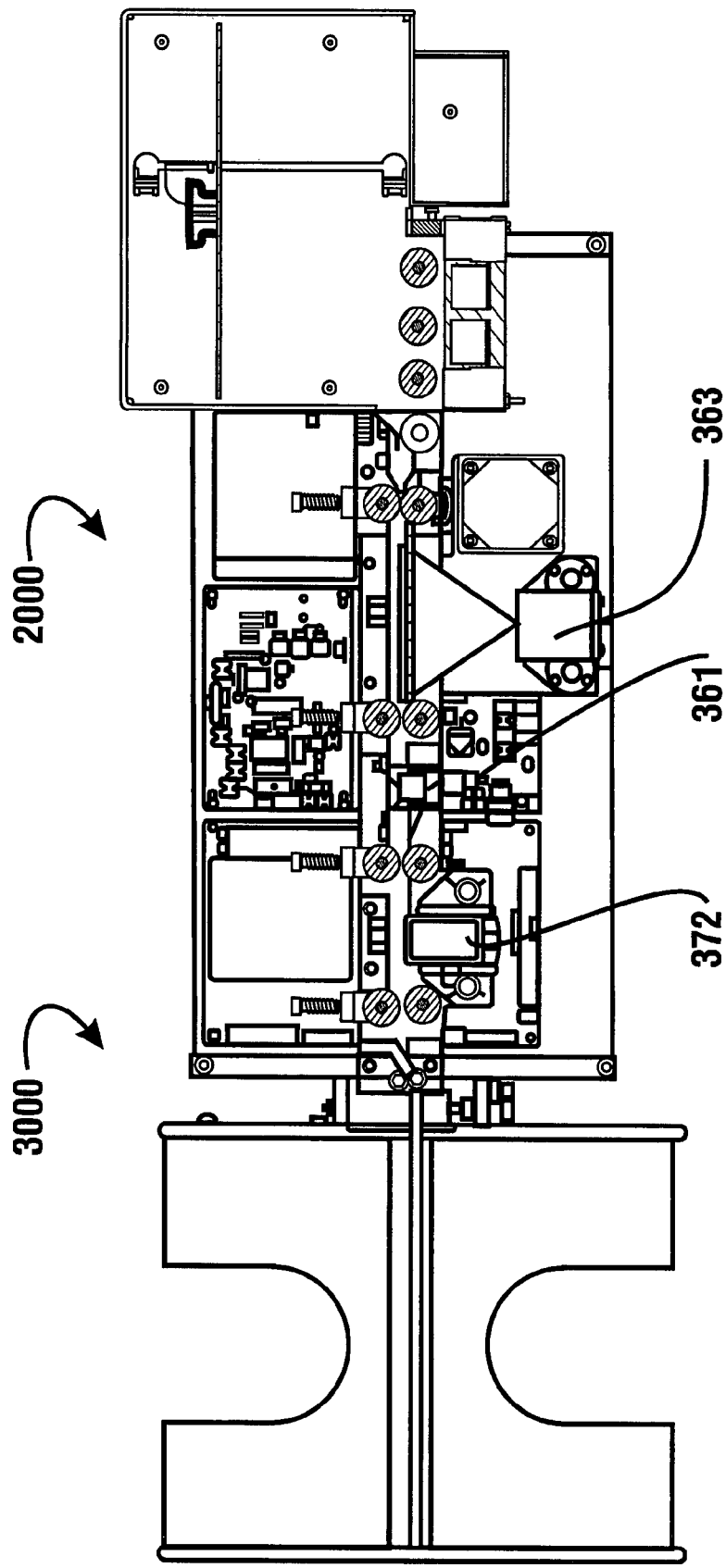
FIG. 17 is a view of the interior of the exemplary ballot envelope scanner illustrated in FIG. 14.

In the exemplary embodiment illustrated in FIG. 2, the processing unit 300 enclosure 305 includes an access door 307 which may be removed to permit access to the processing unit 300. As illustrated in FIG. 16, the combined feed and processing unit 2000 includes an access door 2010 in the rear of the unit 2000 to permit access to the combined feed and processing unit 2000. In addition the enclosures 230 and 305 for each of the feed and processing units 200, 300 are releasably affixed to internal structural elements in order to permit easy access to the functional elements of the ballot envelope scanner 100 for maintenance, to release paper jams, or for other reasons. The enclosure 2005 is similarly releasably affixed to the feed and processing unit 2000.

Each of the feed, processing, and ballot units 200, 300, and 400 is equipped with sensors 120, one of which may be seen in FIG. 12, which are adapted to detect when the feed processing and ballot units 200, 300, and 400 are disconnected from each other, when any of the access ports have been opened, or when the enclosure walls have been removed. In addition, the processing unit 300 includes sensor pairs 122 spaced along the paper path 210, one of which is schematically represented in FIG. 6. The spacing of the sensors 122 such at all times at least one of these should not be blocked by a ballot envelope 510. If all sensor pairs 122 are blocked, the paper movement is not functioning properly. If any of these conditions are detected, power to the drive motors 254, 320, 340 is automatically shut off. In addition, in the exemplary embodiment illustrated in FIG. 2 the ballot envelope scanner 100 is equipped with a stop button 311 which may be pressed to shut off the drive motors 254, 320, 340.

A second exemplary embodiment of an ballot envelope scanner 100, discussed in part above, is illustrated in FIGS. 14-18. In the exemplary embodiment illustrated in FIG. 14, the feed and processing units are combined into a single, more compact, combined feed and processing unit 2000. In the exemplary embodiment illustrated, the combined feed and processing unit 2000 uses one motor 2055 to drive the rollers in the feed portion 2050 from below, and a single motor 2060, stacked on top of motor 2055, to drive the rollers in the processing portion 2080.

Figure 15:
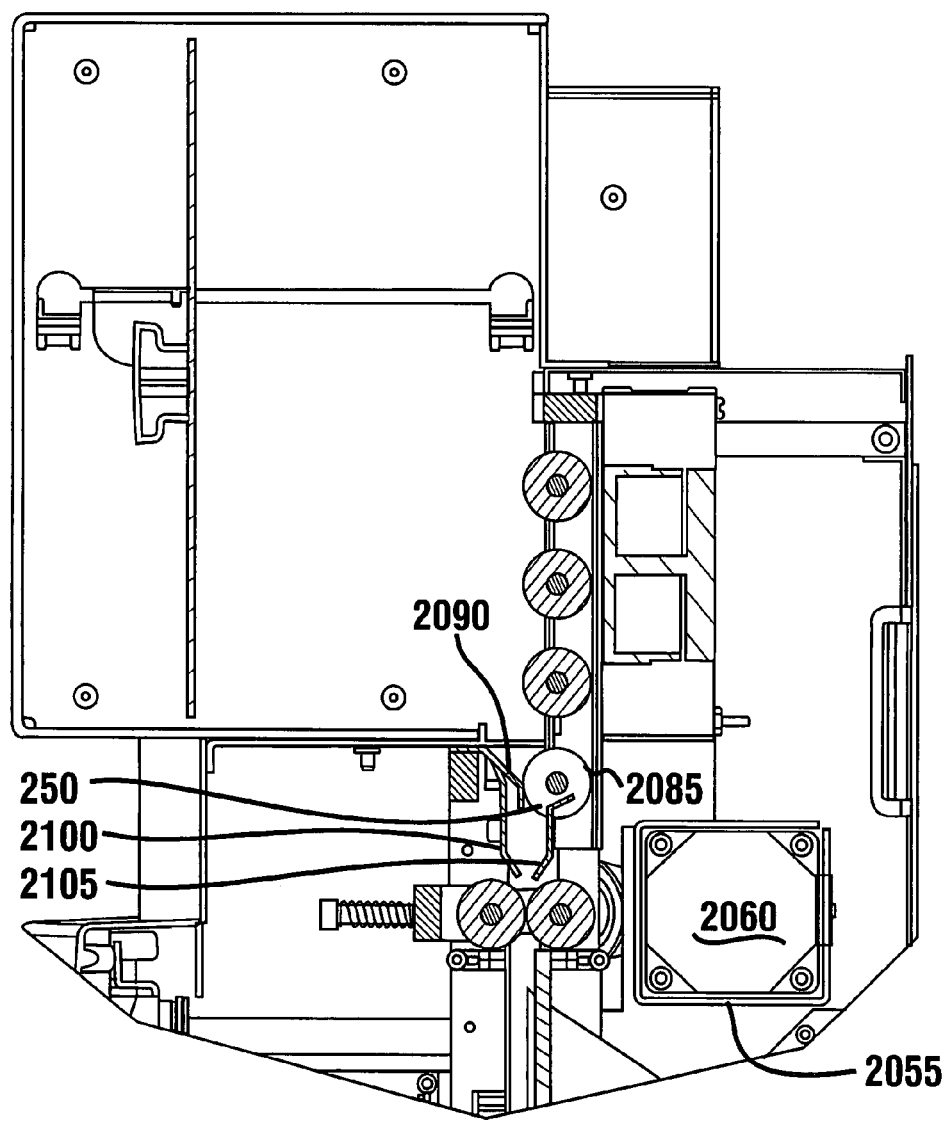
FIG. 15 is a plan view of an exemplary feed portion of the exemplary ballot envelope scanner illustrated in FIG. 14.
Figure 18:
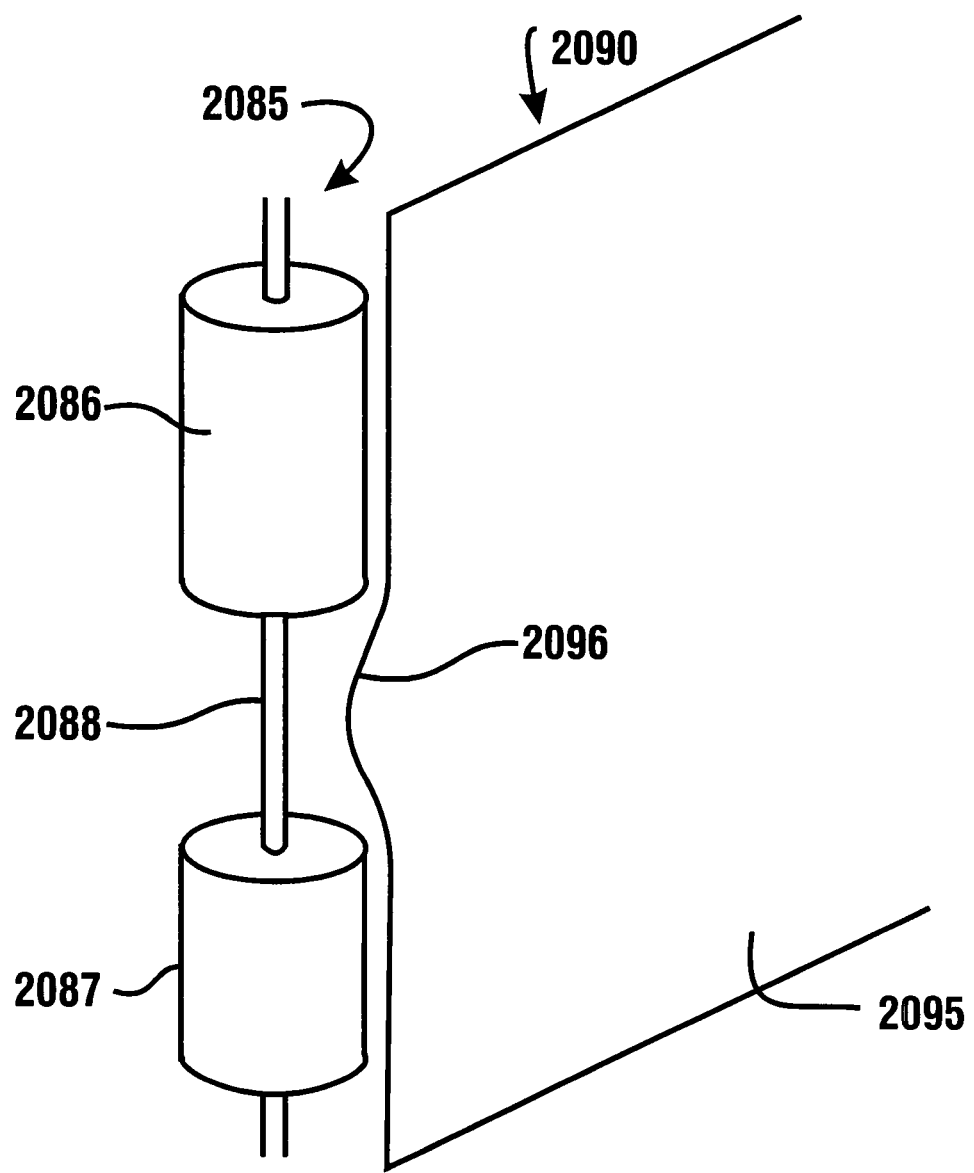
FIG. 18 is a perspective view of a waffle roller and waffle bracket.

In the exemplary embodiment illustrated in FIG. 15 a waffle roller 2085 and waffle bracket 2090 are used instead of a brush 266 to minimize double feeds of ballot envelopes. The waffle roller 2085, most clearly illustrated in FIG. 18, is a roller comprised of two or more distinct roller portions 2086, 2087, creating at least one portion of the waffle roller 2088 having a smaller diameter than the roller portions 2086, 2087. The waffle roller 2085 is paired with a waffle bracket 2090 which comprises a plate 2095 extending tangentially to the waffle roller having a ridge or bulge 2096 which aligns with the portion of the waffle roller 2088 having a smaller diameter. As a ballot envelope passes between the waffle roller 2085 and the waffle bracket 2090, a crease is formed which discourages the passage of multiple ballot envelopes simultaneously between the waffle roller 2085 and waffle bracket 2090. Although in the exemplary embodiment illustrated herein there is a single gap 2088 and ridge 2096 pair, more pairs may also be used to increase the effectiveness. In addition, as illustrated, paired guide plates 2100, 2105 may be used to urge the ballot envelope to straighten after passing between the waffle roller 2085 and waffle bracket 2090.

In the exemplary embodiment of a ballot envelope scanner 100 illustrated in FIG. 16, two separate scanners are used, a bar code scanner 363 and an image scanner 361. In some exemplary embodiments, using the bar code scanner 363 permits faster recognition of the voter identifier 512 than interpreting an imaged bar code and eliminates the need the ballot envelope to travel at different speeds through portions of the ballot envelope scanner 100. Combined with sufficient processing power, this may eliminate the need for clutched rollers described in the first exemplary embodiment.

The ballot envelope scanner 100 is operatively connected to a workstation application 500 on a computer 2300 which directs the operation of the motors, scanner, solenoid, and printer, either directly or through on board processors 520. The computer 2300 may be a separate physical unit, as discussed in connection with the exemplary embodiment illustrated in FIG. 4, or to ensure that the workstation application is not impeded by unrelated application software, in some exemplary embodiments the workstation application may be embedded in an on-board computer 2300, as illustrated in FIG. 14. In other exemplary embodiments such an on-board computer 2300 may also include the server applications for signature comparison.

In each case, the ballot envelope scanner 100 is operatively connected to a workstation application 500 on a computer 2300 which directs the operation of the motors, scanner, solenoid, and printer, either directly or through on-board processors 520. The computer 2300 may be a separate physical unit, as discussed in connection with the exemplary embodiment illustrated in FIG. 4, or may be embedded in the ballot envelope scanner 100 as illustrated in exemplary fashion in FIG. 14. In each case software comprising a workstation application 500 is operative in connection with the computer 400 to control the ballot envelope scanner 100. The scanning module 360, motors 254, 320, 340, endorsement module 370, and other elements of the ballot envelope scanner 100 are described as being controlled in part by on-board processors 520. It is contemplated in some exemplary embodiments that part or all of the function of the on-board processors 520 may be performed by the computer 2300 in conjunction with the workstation application 500.

Initially in an exemplary embodiment a user loads a stack of ballot envelopes 510 into the feed unit 200 by pulling the vertical stabilizer 274 away from the feed rollers 250, 252 and inserting the ballot envelopes 510 vertically between the vertical plate 280 and the feed rollers 250, 252. In an exemplary embodiment, a workstation application 500 directs the on-board processors 520 to turn on the feed and drive motors 254, 320, 340 and the exhaust fan 260 to begin the scanning process. The vertical stabilizer 274 holds the ballot envelope stack vertical, while the exhaust fan 260 pulls the first ballot envelope 510 against the feed rollers 250, 252. Driven by the feed motor 254, the ballot envelope 510 is moved toward the output slot 242 in the feed unit 200. If friction causes a second ballot envelope 510 to move along with a first ballot envelope 510, the leading edge of the second ballot envelope 510 will be held back by the leading edge 268 of the brush 266.

As it enters the processing unit 300, the leading edge of the ballot envelope 510 is pinched between the first roller pair 312 of the first drive unit 310. The biasing elements 324 of the follower rollers 316, which bias the follower rollers 316 toward the drive rollers 314, ensure that there is sufficient friction for the roller pairs 312 to move the ballot envelope 510, regardless of ballot envelope 510 thickness. The drive motor 320 of the first drive unit 310 drives the roller pairs 312 at a slightly higher rate of rotation than the feed rollers 250, 252. Because all of the feed rollers 252 in the feed unit 200 except the first are clutched to freely rotate in the direction of movement along the paper path 210, this permits the ballot envelope 510 to be pulled by roller pair 312 after the ballot envelope's trailing edge leaves the driving feed roller 250. Because the following ballot envelope 510 is immediately in contact with the slower rotating driving feed roller 250, and is initially being held back by the brush 266, this rotational speed differential between the feed rollers and the first drive rollers 212 of the first drive module creates a gap between one ballot envelope 510 and the next, minimizing the risk of paper jams.

Figure 11:
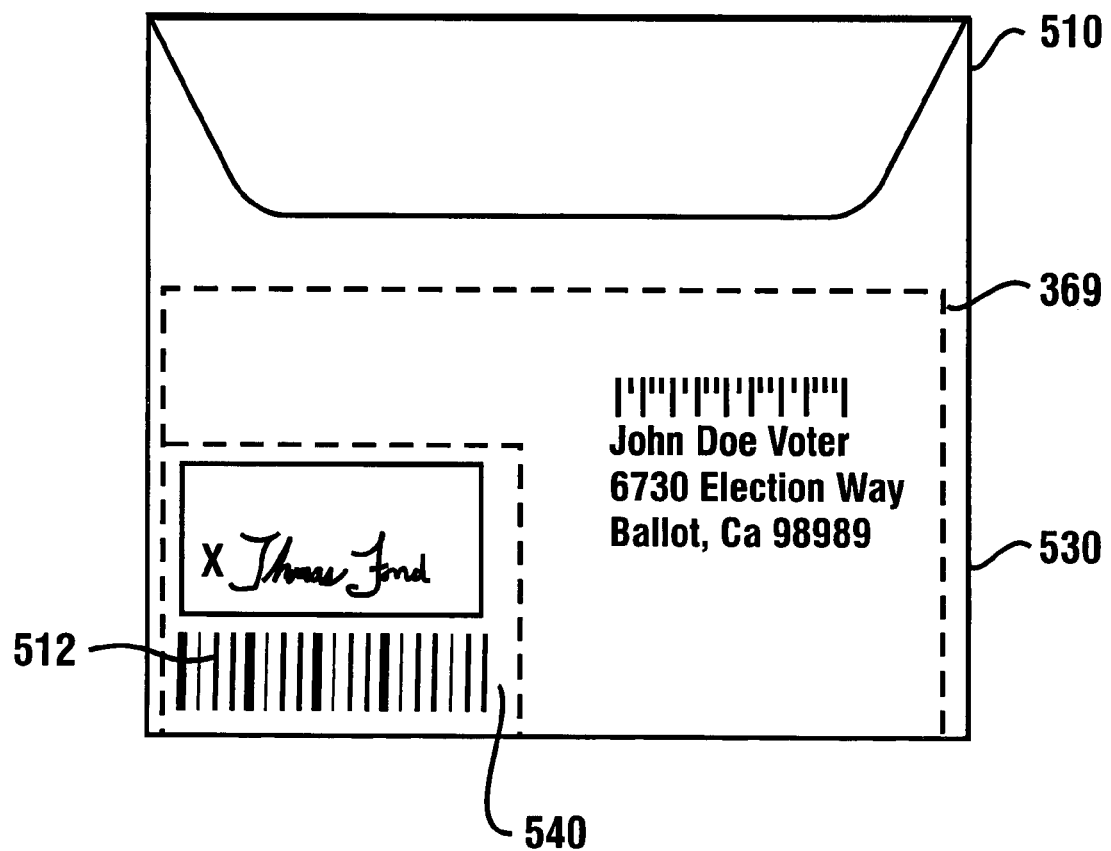
FIG. 11 is a view of a ballot envelope.

When the ballot envelope moves past the scanner 362, an on-board processor 520 directs the scanner 362 to captures an image 369 of a portion of the ballot envelope 510 as the ballot envelope passes. An exemplary embodiment of a ballot envelope 510 is illustrated in FIG. 11, illustrating the image 369, captured shown in phantom. The image 369 contains the bottom portion 530 of the envelope 510. The image 369 is then exported to the workstation application 500 for analysis while the ballot envelope 510 continues to move through the processing unit 300.

Based on user defined coordinates, the workstation application 500 crops the image 369 to contain the voter identifier 512, such as a bar code image, and signature block 514, identified in FIG. 11. The workstation application 500 searches the cropped image 540 using a pattern recognition routine to identify the portion of the cropped image 540, shown in phantom, containing the voter identifier 512. In the alternative, if the ballot station scanner includes a bar code reader 363 and the voter identifier 512 is a bar code the bar code may be read directly. If the workstation application 500 cannot identify the voter identifier 512, a message is transmitted to the on-board processor 520 controlling the solenoid 392 to rotate the diverter plate 396 so that the ballot envelope 510 is diverted into the rejected tray 460. If the workstation application 500 can identify the voter identifier 512, the workstation application 500 translates the voter identifier 512 into the voter number 516 it represents. The workstation application 500 then verifies that the voter number 516 is a valid number. If the voter number 516 is invalid, a message is transmitted to the on-board processor 520 controlling the solenoid 392 to rotate the diverter plate 396 so that the ballot envelope 510 is diverted into the portion of the rejected tray 460. A bin number and sequence number are associated with the voter number 516. The first bin number is specified by the user as part of setting the initial parameters. The sequence number begins at one for each bin, and is incremented by one for each new ballot envelope with valid voter number 516. The cropped image 540 is stored in a file associated with the voter number 516, bin, and sequence number. The workstation application 500 directs the on-board processor 520 which controls the print head 372 to print an endorsement 518 (not specifically illustrated) on the ballot envelope 510 that corresponds to the voter number 516, bin, and sequence number assigned to that ballot envelope 510.

As schematically shown in FIG. 10, while the workstation application 500 is processing the image 369, the ballot envelope 510 continues to move along the paper path 210 through the processing unit 300. The second drive module rollers 332 are driven at a slightly slower rotational rate than the first drive module rollers 312 to permit the workstation application 500 sufficient processing time to determine whether it is necessary to divert the ballot envelope 510 into the rejected tray 460. The leading edge of the ballot envelope 510 passes through the first pair of second drive module rollers 332. The drive roller 314 for the first pair of rollers 312 is clutched so that it rotates freely in the direction of the ballot envelope 510 motion. Because of this, the ballot envelope 510 continues to move at the same rate of speed until the leading edge is pinched between the second pair of drive rollers 332 associated with the second drive module 330, which are not clutched. The ballot envelope 510 then slows its movement along the paper path 210 slightly to correspond to the linear speed generated by the slower rotation of the second pair of drive rollers 332 associated with the second drive module 330.

If the cropped image 540 contained readable voter identifier 512 corresponding to a valid voter number 516, the print head 372 will print an endorsement 518 on the ballot envelope 510 as it passes. The ballot envelope 510 will continue along the straight paper path 210 into the output unit 400. In an exemplary embodiment, ballot envelope 510 slides along the guide 414, and is toppled into the accepted tray 450 as it is gradually pushed out from the shared wall 412 by the flipping element 416. If the cropped image 540 did not contain a bar code image 512 corresponding to a valid voter number 516, or if the voter identifier 512 was not readable, the print head will not print an endorsement 518 on the ballot envelope 510. In addition, if the cropped image 540 did not contain a bar code image 512 corresponding to a valid voter number 516, or if the voter identifier 512 was not readable the processor 520 controlling the solenoid 392 will have received instructions to rotate the diverter plate 396 to force the ballot envelope 510 into the rejected tray 460.

This process is repeated, incrementing the sequence number by one for each voter identifier 512 that is readable and corresponds to a valid voter number 516, until the sequence number has reached the quantity of ballot envelopes 510 for each bin specified during setup as the bin count. In the exemplary embodiment illustrated, the workstation application 500 then pauses the scanning process to permit the user to move any remaining ballot envelopes 510 from the accepted tray 450 to the storage bin.

In the exemplary embodiment illustrated, either based on a predetermined time interval or in response to user selection, the workstation application 500 increments the bin number by one, resets the sequence number to one, and restarts the feed and drive motors 254, 320, 340. In some embodiments, a single server will be used to control multiple ballot envelope scanners 100. In this instance, the workstation application 500 associated with a particular ballot envelope scanner 100 will query the server for the next available bin number rather than automatically incrementing the bin number by one. Although in the exemplary embodiment just discussed, the workstation application 500 caused the scanning process to stop periodically to permit bin clearing, in other exemplary embodiments the workstation application may not cause the scanning process to stop until all of the envelopes in the infeed tray have been scanned.

Ballot envelopes 510 that are diverted to the rejected tray 460 will need to be processed by hand. Some may have been diverted because they were loaded backwards or upside down. Others may have had the barcode damaged during the mail process. In still other cases, a voter may have deliberately obscured the barcode and/or voter number 516. Those ballot envelopes 510 that have potentially readable barcodes may be rerun through the ballot envelope scanner 100.

Occasionally, the ballot envelope scanner 100 may stop during the processing of ballot envelopes 510 because of a paper jam, because the individual units were inadvertently separated, because one of the access doors was opened, or because someone turned the ballot envelope scanner 100 off. Once reason for the processing halt has been resolved, some ballot envelopes 510 that have been endorsed may need to be rerun. An endorsement 518 may have only partially printed. If the ballot envelope 510 stopped in front of the print head 372 all of the characters of the endorsement 518 may have printed in one print position. In one exemplary embodiment, the user will be requested to identify the last valid and readable sequence number, and to provide that endorsement number 518 to the workstation application 500. In other exemplary embodiments alternate methods of identifying a valid endorsement may be used, such for example using a default setback from the current sequence number and requesting the user to physically locate the ballot with the corresponding endorsement number 518. The ballot envelope 510 bearing that endorsement 518 and all ballot envelopes 510 that followed it should be reprocessed. In one exemplary embodiment, before reprocessing the ballot envelopes 510, the user should move the print head 372 up or down relative to its previous print position so that the new endorsement 518 does not print on top of the previous endorsement 518. In another exemplary embodiment, the workstation application 500 may permit the endorsement to be printed in a different horizontal location by modifying the print timing.

If the reason for the pause in scanning was a paper jam, the workstation application 500 may be used to direct the ballot envelope scanner 100 to run a jam clearing operation. Before running a jam clearing operation, any ballot envelope 510 that is protruding from the last pair of rollers 232 in the second drive module 230 should be pulled through the rollers 232 and placed aside for rescanning. The jam clearing operation directs the solenoid 392 to rotate the diverter plate 396 to divert all ballot envelopes 510 into the rejected tray 460 and to operate all rollers 250, 252, 212, 232, 346 at a rate of low speed with high torque in order to force any jammed ballot envelopes 510 through the paper path 210 into the rejected tray 460. These ballot envelopes 510 should also be set aside to be rerun.

Periodically, the workstation application 500 will upload the cropped image 540 files, and associated identifying numbers, to a server application 600. These files will be merged with other similar files. In addition, at regular intervals during the processing of ballot envelopes 510, a server application 600 may be used to generate reports that will assist election officials in their efforts to ensure that every registered voter that attempts to vote once has his or her ballot counted, and that no voter has more than one ballot counted.

Reports may be generated that identify multiple ballot envelopes 510 associated with a single voter number 516. Election officials may then use the information associated with that voter number 516 to determine the exact location of the questionable ballots by bin and sequence number. Similarly, if the ballot envelopes 510 are processed before election day, data may be exported to the voter registration database 100 to update that data to reflect the ballots already received.

This minimizes the need for individuals who may have requested and returned a mail in ballot to cast a provisional vote at the polling place, since it can be definitively stated that the mail in ballot has already been returned.

Reports may also be generated that include voter numbers 516 that are associated with blank files, and any cropped images 540 that could not be matched with voter numbers 516 because the voter identifier 512 could not be interpreted. If the voter number can be visually read or the voter identified by the signature or other identifying information, these reports may be used to manually associate cropped images 540 with voter numbers 516.

Once cropped images 540 have been associated with stored signature images based on the voter numbers 516, the signatures must be verified. A signature verification component 620 of server application 600 provides two improvements over previously available technology. Using the voter number 516, the signature verification component 620 can automatically display the cropped image 540 and the stored image associated with that voter number 516 side by side for visual comparison, without the need to search manually for the specific image. This is generally done sequentially for all of the cropped images associated with a particular tray of ballot envelopes 510, making it easy to locate ballot envelopes 510 which contain cropped images which do not match the associated stored signature images.

In another exemplary embodiment, the signature verification component 620 can employ algorithms or subroutines to electronically compare signatures based on user defined parameters in order to electronically match as many of the stored images with the cropped images as possible. The algorithm or subroutine may compare elements such as letter formation, ligatures, loop and stroke shapes, complete or incomplete connecting strokes, slant, size, letter and word proportions, and other relevant characteristics known to those skilled in the art to create a confidence factor or other indicator of reliability of comparison. In an exemplary embodiment, the server application may permit the user to set a particular confidence or reliability level before an automated signature verification is acceptable. In other exemplary embodiments, it may permit the user to weight one factor more heavily than others in creating the confidence or reliability level. In an exemplary embodiment, the server application 600 can then generate a report of all cropped images 540 that were not matched electronically for an automated visual side by side comparison.

Once the cropped images are matched, these new images may be exported to the voter registration database 100 to supplement the existing signature images in the database. In some instances, the supplementary images may be merged with the existing signature images to create a more accurate signature recognition over time than is possible when a single exemplar is used. For purposes of example only, and not limitation, this merger may be literal to create a single new signature for comparison, it may be a figurative merger based on weighting certain features based on the consistency with which the voter repeats particular elements, or it may include other means now known or which become known and which could be incorporated into a signature recognition algorithm or subroutine to increase the accuracy thereof.

In the foregoing description certain terms have been used for brevity, clarity, and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function and shall not be limited to the structures shown herein or mere equivalents thereof.

Having described the features, discoveries and the principles of the invention, the manner in which it is constructed and operated and the advantages and useful results attained; the new and useful structures, devices elements, arrangements, parts, combinations, systems, equipment, operations, methods and relationships are set forth in the appended claims.

We claim:

1. A method comprising:
   (a) operating a ballot envelope processing system including at least one drive device and at least one scanning device to:
      (a1) cause a returned ballot envelope including a voter identifier and a voter signature to be automatically driven relative to the at least one scanning device by the at least one drive device,
      (a2) cause the voter identifier and the voter signature to be automatically scanned by the at least one scanning device;
   (b) operating at least one computer to retrieve a plurality of stored signatures correlated with the voter identifier scanned in step (a2) from a voter registration database, wherein the at least one computer is in operative connection with the at least one scanning device;
   (c) operating the at least one computer to enable a decision to be made on verification of the voter signature, wherein the decision is based on comparison of data corresponding to the voter signature scanned in step (a2) with data corresponding to the plurality of stored signatures retrieved in step (b);
   (d) responsive to verification of the voter signature in step (c), operating the at least one computer to cause the voter signature scanned in step (a2) to be stored in the voter registration database to thereby supplement the stored signatures;
   (e) operating the at least one computer to determine whether the voter identifier scanned in step (a2) is a valid voter identifier; and
   (f) responsive to a determination of a valid voter identifier in step (e), operating the at least one computer to determine a bin number and a sequence number designating a location in which the ballot envelope is to be stored and then cause an endorsement comprising the bin number and the sequence number to be printed on the ballot envelope.

2. The method according to claim 1, wherein the data corresponding to the voter signature scanned in step (a2) is compared with the data corresponding to the plurality of stored signatures retrieved in step (b) using at least one signature comparison computer program.

3. The method according to claim 1, wherein step (c) includes operating the at least one computer to cause at least one display device to simultaneously visually display both the voter signature scanned in step (a2) and the plurality of stored signatures retrieved in step (b) to enable visual comparison therebetween.

4. The method according to claim 3 and further comprising:
   (g) visually comparing the voter signature scanned in step (a2) with the plurality of stored signatures retrieved in step (b) as displayed on the display device; and (h) making the decision based on the visual comparing in step (g), wherein the decision is a human decision, wherein the decision making includes determining whether the voter signature scanned in step (a2) corresponds to a valid voter signature for the scanned voter identifier.

5. The method according to claim 1,
wherein step (a2) includes capturing the voter signature as electronic image data;
wherein step (b) includes retrieving the plurality of stored signatures as electronic signature image data;
and further comprising:
(g) comparing the electronic image data captured in step (a2) with the electronic signature image data retrieved in step (b); and
(h) making the decision based on the comparing in step (g).

6. The method according to claim 5 wherein step (a2) includes:
(a2i) automatically operating a reader device to read the voter identifier from the returned ballot envelope; and
(a2ii) automatically operating an image capture device to capture the voter signature from the returned ballot envelope.

7. The method according to claim 6 wherein step (a2i) includes reading a barcode on the returned ballot envelope, wherein the barcode includes the voter identifier.

8. A method comprising:
(a) receiving a stack of returned ballot envelopes into a feed tray of a ballot envelope scanner system of a ballot envelope processing system, wherein each returned ballot envelope includes a voter identifier and a voter signature, wherein the ballot envelope processing system includes at least one computer in operative connection with the ballot envelope scanner system, wherein the ballot envelope scanner system includes at least one drive device, a feed portion, a processing portion, and an output portion, wherein the feed portion includes the feed tray which is configured to receive the stack of returned ballot envelopes, wherein the processing portion includes at least one scanning device, wherein the output portion includes an accepted tray and a rejected tray;
(b) operating the ballot envelope processing system to:
(b1) cause each returned ballot envelope to be automatically driven relative to the at least one scanning device by the at least one drive device,
(b2) cause the voter identifier and the voter signature to be automatically scanned by the at least one scanning device;
(c) operating the at least one computer to retrieve at least one stored signature correlated with the voter identifier scanned in step (b2);
(d) operating the at least one computer to enable a decision to be made on verification of the voter signature, wherein the decision is based on comparison of data corresponding to the voter signature scanned in step (b2) with data corresponding to the at least one stored signature retrieved in step (c);
(e) storing data reflective of the decision; and
(f) operating the at least one drive device to move each returned ballot envelope into one of the accepted tray and rejected tray.

9. An apparatus comprising:
a ballot envelope processing system including at least one drive device and at least one scanning device, wherein the at least one drive device is operative to cause a returned ballot envelope including a voter identifier and a voter signature to be automatically driven relative to the at least one scanning device, wherein the at least one scanning device is operative to cause the voter identifier and the voter signature to be automatically scanned from the returned ballot envelope,
at least one computer in operative connection with the at least one scanning device, wherein the at least one computer is operative to retrieve at least one stored signature correlated with the voter identifier scanned by the at least one scanning device, wherein the at least one computer is operative to enable a decision to be made on verification of a voter signature, wherein the decision is based on comparison of data corresponding to the voter signature scanned by the at least one scanning device with data corresponding to the at least one stored signature retrieved by the at least one computer, wherein the at least one computer is operative to store data reflective of the decision;
an output unit in operative connection with the at least one computer, wherein the output unit is operative to store the ballot envelope;
wherein the at least one computer is operative to communicate with at least one database to determine whether the voter identifier scanned from the returned ballot envelope by the at least one scanning device is a valid voter identifier, and
wherein the at least one computer is further operative to determine a bin number and a sequence number designating a location in which the ballot envelope is to be stored and then cause an endorsement comprising the bin number and the sequence number to be printed on the returned ballot envelope.

10. The apparatus according to claim 9, and further comprising at least one signature comparison computer program, wherein the at least one computer is operative to use the at least one signature comparison computer program to compare data corresponding to the voter signature scanned by the at least one scanning device with data corresponding to the at least one stored signature retrieved by the at least one computer.

11. The apparatus according to claim 10 wherein the at least one computer is operative to make the decision on verification of a voter signature, wherein the decision making includes determining whether the voter signature scanned from the returned ballot envelope by the at least one scanning device corresponds to a valid voter signature for a voter identifier scanned from the same returned ballot envelope by the at least one scanning device.

12. The apparatus according to claim 9, and further comprising at least one display device, wherein the at least one computer is operative to cause the at least one display device to simultaneously visually display both the voter signature scanned from the returned ballot envelope and at least one stored signature retrieved to enable visual comparison therebetween.

13. The apparatus according to claim 12 wherein the at least one computer is operative to cause the at least one display device to display side by side the voter signature scanned and the at least one stored signature retrieved.

14. The apparatus according to claim 9, wherein the ballot envelope processing system further includes an accepted tray and a rejected tray, and wherein the at least one computer causes the at least one drive device to move the returned ballot envelope into one of the accepted tray and the rejected tray.

* * * * *

UNITED STATES PATENT AND TRADEMARK OFFICE
CERTIFICATE OF CORRECTION

PATENT NO. : 8,740,058 B2  
APPLICATION NO. : 11/820787  
DATED : June 3, 2014  
INVENTOR(S) : Brian Brucker et al.

It is certified that error appears in the above-identified patent and that said Letters Patent is hereby corrected as shown below:

Title Page,

Item 73, Assignee,
Line 18, on the front page of the Patent, delete "Electron" and insert -- Election -- therefor.

Signed and Sealed this
Twenty-sixth Day of August, 2014

Michelle K. Lee
*Deputy Director of the United States Patent and Trademark Office*